(12) United States Patent
Das et al.

(10) Patent No.: US 8,135,626 B2
(45) Date of Patent: Mar. 13, 2012

(54) BID GATEWAY ARCHITECTURE FOR AN ONLINE ADVERTISEMENT BIDDING SYSTEM

(75) Inventors: Shirshanka Das, Santa Clara, CA (US); Sunil Nagaraj, Sunnyvale, CA (US); Sangeeta Singh, Saratoga, CA (US); Chavdar Botev, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 440 days.

(21) Appl. No.: 12/398,877

(22) Filed: Mar. 5, 2009

(65) Prior Publication Data
US 2010/0228641 A1 Sep. 9, 2010

(51) Int. Cl.
*G06Q 30/00* (2006.01)
*G06F 17/30* (2006.01)
(52) U.S. Cl. .................. 705/26.4; 705/14.4; 705/14.71; 705/26.1; 705/26.3
(58) Field of Classification Search ........ 705/26.1–27.2, 705/14.4–14.73
See application file for complete search history.

(56) References Cited

U.S. PATENT DOCUMENTS

| | | | |
|---|---|---|---|
| 2002/0007324 A1* | 1/2002 | Centner et al. | 705/26 |
| 2005/0108107 A1* | 5/2005 | Grayson et al. | 705/26 |
| 2005/0216365 A1* | 9/2005 | Lagge | 705/27 |
| 2006/0271438 A1 | 11/2006 | Shotland et al. | |
| 2008/0010365 A1 | 1/2008 | Schneider | |
| 2008/0243601 A1 | 10/2008 | Patel et al. | |
| 2008/0262917 A1 | 10/2008 | Green | |
| 2009/0055497 A1* | 2/2009 | Dickerson et al. | 709/207 |
| 2010/0106613 A1 | 4/2010 | Bhatia et al. | |

FOREIGN PATENT DOCUMENTS
KR 10-2007-0038753 A 4/2007
(Continued)

OTHER PUBLICATIONS

"Experimental Study of Reverse Logistics E-Commerce". Sarah M. Ryan. K. Jo Min. Sigurdur Olafsson. Conference Title: Conference Record 2002 IEEE International Symposium on Electronics and the Environment Conference Date: May 6-9, 2002 Conference Location: San Francisco, CA, USA.*

(Continued)

*Primary Examiner* — Will Allen
(74) *Attorney, Agent, or Firm* — Stattler-Suh PC

(57) ABSTRACT

An online advertising system integrates third party agents to permit the third party agents to participate in auctions to bid on a per opportunity basis. An advertising exchange module receives requests for opportunities to serve online advertisements to users. In response, an advertising exchange module applies one or more business rules to determine third party agents that qualify to serve the online advertisement. A bid gateway module generates and transmits requests for bids to the third party agents. The bid gateway module then receives bids from the third party agents in response to the requests for bids. The advertising exchange module then selects an advertisement based on the bid. The online advertisement exchange system provides a unified marketplace to permit integrator networks to bid on both ads pursuant to guaranteed contracts and ads not subject to guaranteed contracts (e.g., non-guaranteed ads). The online advertisement system further includes traffic management to allow the third parties to regulate bid requests sent from the online advertisement system. In some embodiments, the online advertising system caches bids, to efficiently implement the per opportunity auction, and transmits information, such as targeting information, to the third party agents to aid in the third party agents' formulation of bids.

14 Claims, 28 Drawing Sheets

FOREIGN PATENT DOCUMENTS

KR 10-2008-0004015 A 1/2008

OTHER PUBLICATIONS

Written Opinion of the International Searching Authority for Related Foreign Application PCT/US2010/024390.
International Search Report for Related Foreign Application PCT/US2010/024390.
U.S. Appl. No. 12/398,841, filed Mar. 5, 2009, Ghosh, et al.
U.S. Appl. No. 12/398,930, filed Mar. 5, 2009, Ghosh, et al.
U.S. Appl. No. 12/398,833, filed Mar. 5, 2009, Ghosh, et al.
U.S. Appl. No. 12/398,914, filed Mar. 5, 2009, Baker, et al.
U.S. Appl. No. 12/398,908, filed Mar. 5, 2009, Das, et al.
U.S. Appl. No. 12/398,841, filed Mar. 5, 2009, Ghosh et al.
U.S. Appl. No. 12/398,908, filed Mar. 5, 2009, Das et al.
U.S. Appl. No. 12/398,930, filed Mar. 5, 2009, Ghosh et al.
U.S. Appl. No. 12/398,833, filed Mar. 5, 2009, Ghosh et al.

\* cited by examiner

BID GATEWAY ARCHITECTURE FOR AN ONLINE ADVERTISEMENT BIDDING SYSTEM

BACKGROUND OF THE INVENTION

1. Field of the Invention

The present invention is related to the field of advertising systems, and is more specifically directed to a online bidding advertisement system.

2. Art Background

Electronic exchanges, including online auctions, have proliferated along with the Internet. These electronic exchanges aim to provide a high degree of trading efficiency by bringing together a large number of buyers and sellers. Such exchanges are typically focused on directly matching the bids and offers of buyers and sellers. Conventional transactions on these exchanges are typically between (i) buyers and sellers, (ii) intermediaries (e.g., brokers, which may be a buyer or seller), or (iii) buyers or sellers and intermediaries.

The proliferation of Internet activity has also generated tremendous growth for advertising on the Internet. Typically, advertisers (e.g., buyers of ad space) and online publishers (sellers of ad space) have agreements with one or more advertising networks (ad networks), which provide for serving an advertiser's banner or ad across multiple publishers, and concomitantly provide for each publisher having access to a large number of advertisers. Ad networks, which may also manage payment and reporting, may also attempt to target certain Internet users with particular advertisements to increase the likelihood that the user will take an action with respect to the ad. From an advertiser's perspective, effective targeting is important for achieving a high return on investment (ROI).

Online advertising markets exhibit undesirable inefficiencies when buyers and sellers are unable to transact. For instance, although a publisher may be subscribed to many ad networks, and one or more of those ad networks may transact inventory with other ad networks, only one of the ad networks to which the publisher is subscribed is involved in selling (e.g., auctioning) a given ad space for the publisher. The publisher, or a gatekeeper used by the publisher, selects or prioritizes which ad network, or advertiser having a direct agreement with the publisher, serves the impression for a given ad request.

Within this document, one of ordinary skill recognizes certain abbreviations such as, for example, cost per impression, Cost Per Mille, or cost per 1000 impressions (CPM), cost per click (CPC), cost per acquisition (CPA), effective CPM (eCPM).

SUMMARY OF THE INVENTION

An online advertisement system includes at least one exchange server. The exchange server generates requests for advertising bids to conduct an auction. The requests for advertising bids comprises information to identify at least one third party recipient. The online advertisement system also includes at least one bid gateway server coupled to the exchange server. The bid gateway server receives the request for an advertising bid from the exchange server, and configures a third party bid request for each recipient identified in the request for an advertising bid. The bid gateway then transmits the third party bid request from the bid gateway server to at least one third party recipient, and collects at least one bid from the third party recipients. The bids are forwarded to the exchange server to determine a winner of the auction.

A system employs an architecture that efficiently conducts auctions for services. The system includes at least one Web server that generates at least one request for a service bid. The request for service bids contains information to identify at least one third party recipient. The system also includes at least one gateway server coupled to the Web server. The gateway server receives a request for a service bid from the Web server, and configures a third party bid request for each recipient identified in the request for a service bid. The bid gateway transmits the third party bid request from the bid gateway server to at least one third party recipient, and then collects and forwards at least one bid from the third party recipients to the exchange server.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

The embodiments of the advertising system are described using a number of terms. In order to aid in clarity, some definitions of the terms used to describe these embodiments follow. However, these terms define general concepts, and thus are not to be construed narrowly. A publisher is generally defined as a Web site that has inventory for the delivery of advertisements. As such, advertisements are displayed on the Web pages of the publisher's Web site. Users are generally defined as those individuals that access Web pages through use of a browser. However, the term user may also be used to describe entities that use the advertising exchange system, such as users that access an application on the advertising exchange system to set parameters. Various participants of the advertising exchange system are referred to as "entities." Thus, the term entity is generally used to describe any number of participants of the advertising exchange system. Those participants include advertisers, publishers, advertising networks and integrator networks.

An advertising network typically integrates entities, such as advertisers and publishers. An advertising network typically operates in conjunction with advertisers and publishers in order to deliver ads, from one or more advertisers, to Web pages of one or more publishers. For example, Yahoo! Inc, the assignee of the present invention, operates such an advertising network.

An integrator network entity generally defines a participant of the advertising exchange system that represents or integrates one or more entities on the advertising exchange system (e.g., advertisers, publishers, advertising networks, etc.). For example, an integrator network may represent advertisers on the advertising exchange system in order to deliver advertisements to publishers, advertising networks and other integrator networks. In some embodiments, the integrator networks are referred to as the "users" of the advertising exchange system. The integrated networks may comprise third party agents that operate on behalf of or are part of the integrator network. The term "third party agent" is used to generally describe an agent or customer that participates in transactions on the advertising exchange system. Similarly, the term "third party recipient" is used to describe a user or participant of the advertising exchange system that receives information from the system, such as bid requests. However, the terms integrator networks, third party agents and third party recipients is intended to represent a broad class of entities, including publishers, advertisers and networks, as well as the agents that represent them, that operate on the advertising exchange system.

Figure 1:
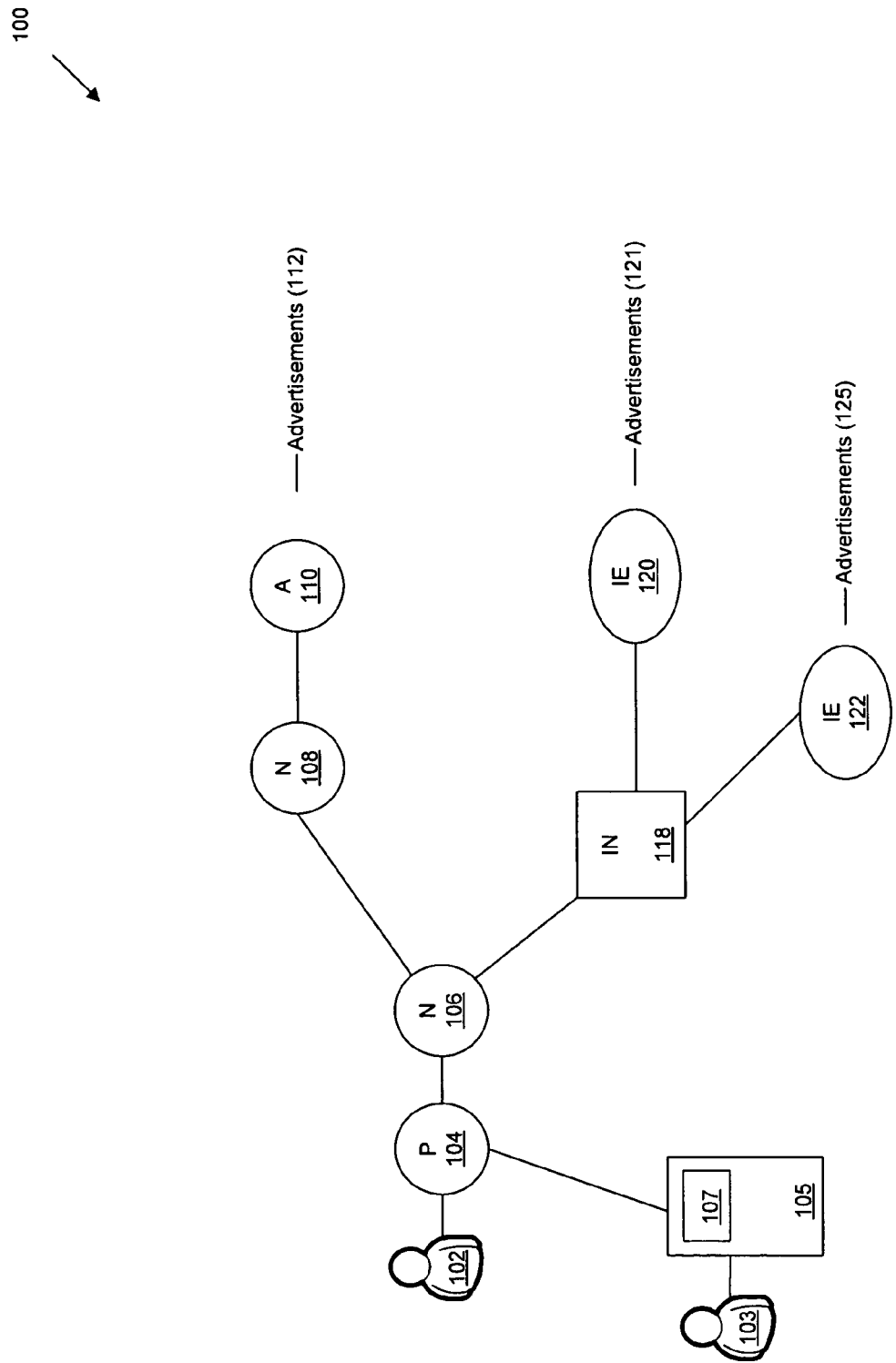
FIG. 1 illustrates one embodiment of an ad delivery system.

FIG. 1 illustrates one embodiment of an ad delivery system. As shown in FIG. 1, the system 100 includes a variety of entities such as users 102 and 103, one or more publishers 104, networks 106 and 108, and/or advertisers 110. The system 100 further includes one or more integrator networks (IN) 118 that have one or more integrated entities (IE) 120 and 122. The various entities including users, publishers, networks, advertisers, integrator networks and integrated entities illustrated in FIG. 1 are merely exemplary, and one of ordinary skill recognizes that the system 100 may include large numbers of entities. Moreover, the various entities are coupled together in different advantageous configurations such as, for example, the exemplary configuration illustrated in FIG. 1.

The user 103 accesses information and/or content provided by the publisher 104. One form of access may include a browser 105 that has inventory locations 107 for the presentation of advertising. In one embodiment, an ad call is generated that requests an advertisement, from advertisements 112, 120 and 121, for placement with the inventory location 107. The corresponding advertisement may be delivered to publisher 104 by one or more networks. For instance, in one example, the network 106 is coupled to the publisher 104, and the network 108 is coupled to the advertiser 110. For this example, the networks 106 and 108 are coupled to each other. The advertiser 110 generally has one or more ad campaigns each comprising one or more advertisements 112 that the advertiser 110 wishes to place with the inventory of publishers such as, for example, the inventory location 107 of the publisher 104 that is presented to the user 103 via the browser application 105.

Figure 2:
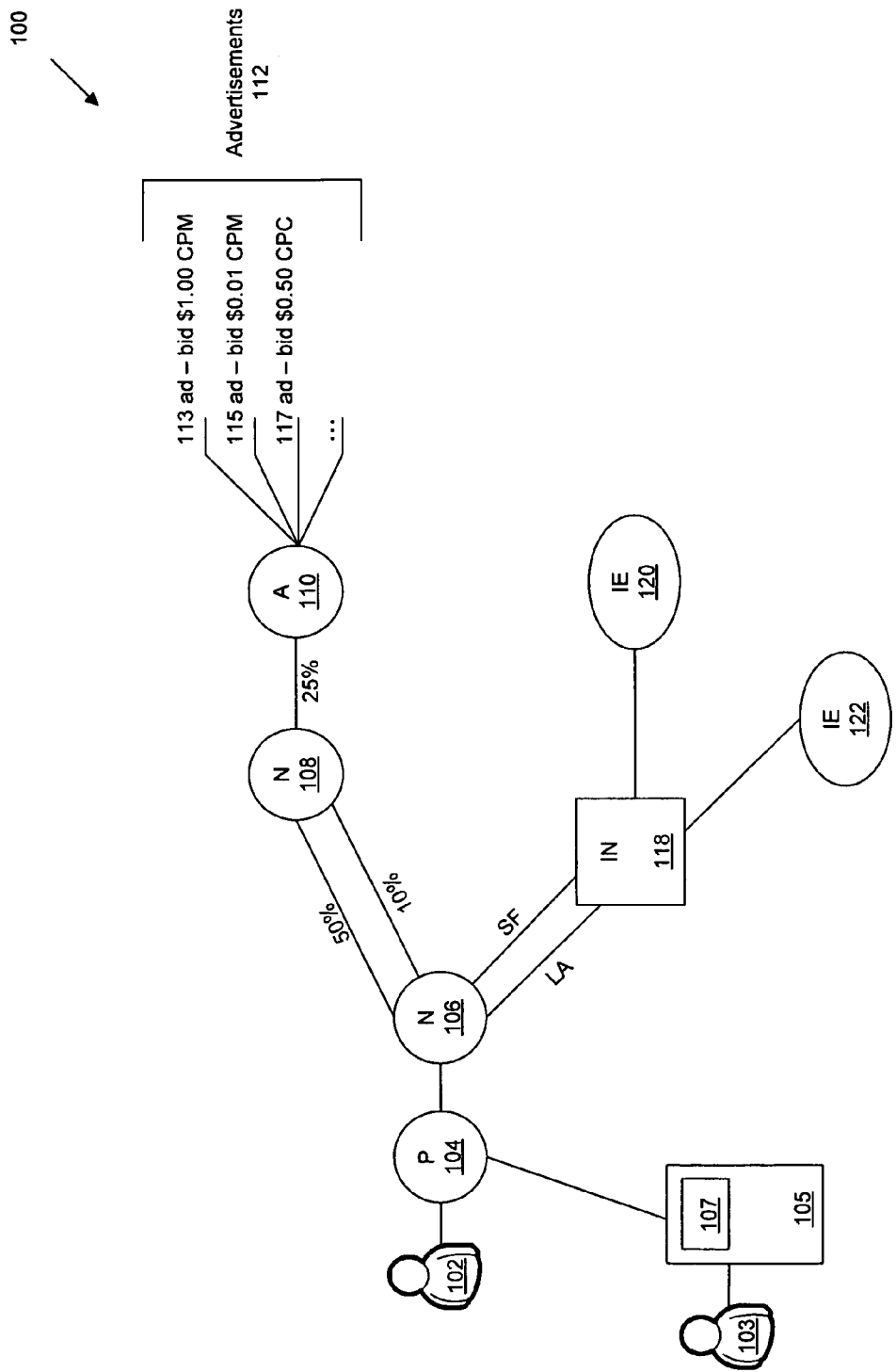
FIG. 2 illustrates another embodiment of an ad delivery system.

FIG. 2 illustrates another embodiment of an ad delivery system. For this example, the advertisements 113, 115, and 117 generally each have an associated bid that the advertiser 110 will pay for the placement of the advertisement with the inventory and for presentation to the user(s). For this example, the advertisement 113 has a bid of $1.00 cost per thousand page impressions ("CPM"), the advertisement 115 has a bid of $0.01 CPM, and the advertisement 116 has a bid of $0.50 cost per click ("CPC"). One of ordinary skill recognizes different types of bids such as, for example, CPM, CPC, cost per action ("CPA"), and others. Some systems normalize the ad bids to CPM.

For the example illustrated in FIG. 2, the entities along the chain of distribution for the advertisements have various revenue sharing agreements. In this example, the network 108 has a 25% revenue sharing agreement with the network 106 for fees paid by the advertiser 110. Similarly, the network 106 has 50% and 10% revenue sharing agreements with the publisher 104 for fees paid to the network 106 by way of the network 108. The multiple revenue sharing agreements between entities may be for different campaigns and/or for targeting different segments of users. For example, the 50% revenue sharing agreement between networks 108 and 106 may be used to target a user segment that includes males under 40 years old, who have an interest in sports. In another example illustrated in FIG. 2, the 10% revenue sharing agreement may be used to target females, over 30 years old, who have an interest in gardening. For these examples, network 108 delivers users of the target segment to network 106, and network 106 is the exclusive representative of the publisher 104. One of ordinary skill recognizes many different payment and/or targeting schemes.

Alternatively, and/or in conjunction with the embodiments described above, some embodiments direct an ad call for the inventory 107 to an integrator network 118. In one example, the ad call is passed from the network 106 to the integrator network 118 with additional information such as, for example, a geographic location for the destination of the advertisement. In the illustration of FIG. 2, one ad call may have a destination of San Francisco (SF), while another ad call may have a destination of Los Angeles (LA). Based on the ad call and/or information, the integrator network 118 selectively responds to ad calls for, or on behalf of, one or more of its integrated entities 120 and/or 122. The integrated entities 120 and 122 generally include third party entities, such as advertisers, that transact on the exchange by using an intermediary, such as the integrator network 118.

Figure 3:
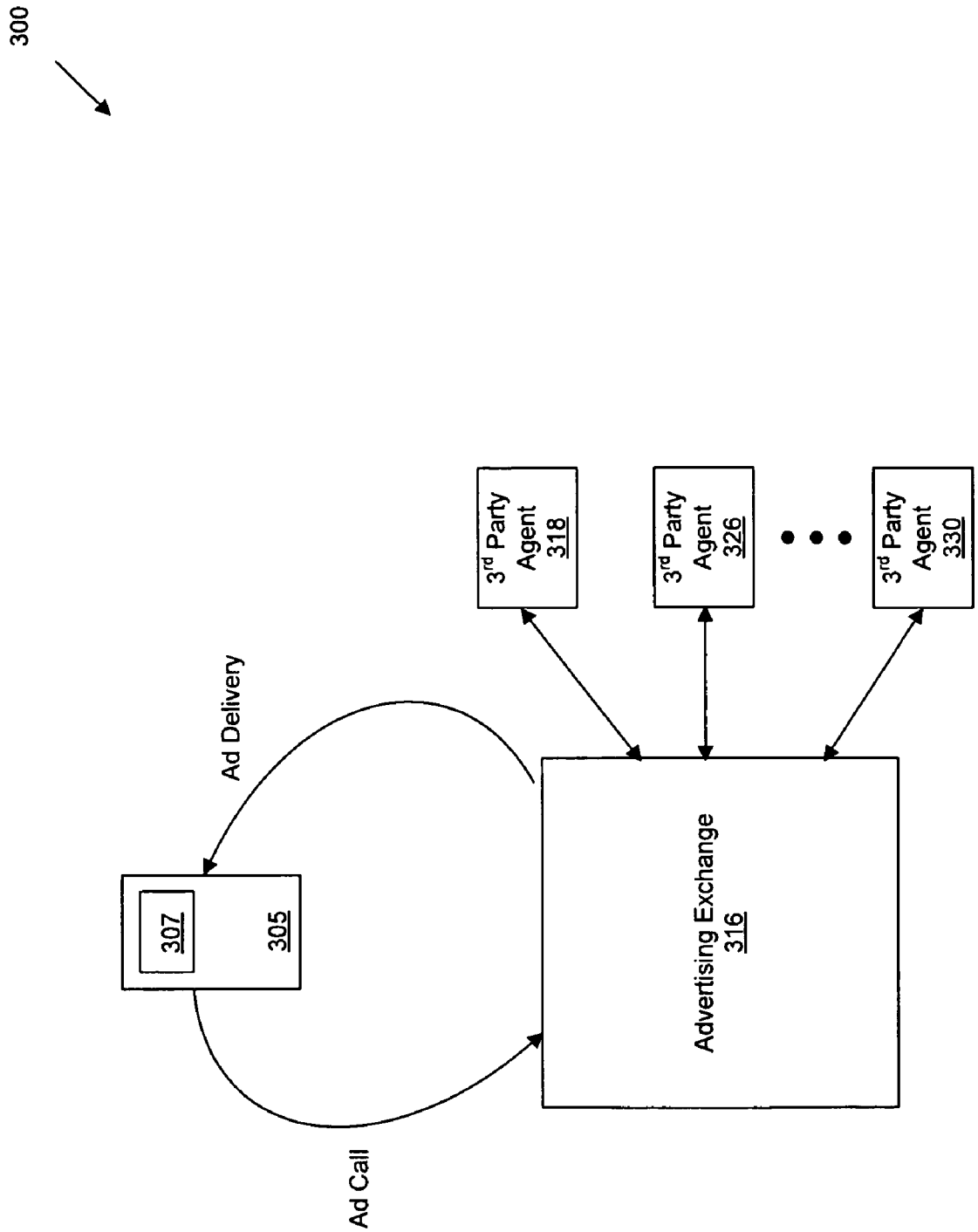
FIG. 3 illustrates an advertisement exchange system according to some embodiments.

FIG. 3 illustrates an advertisement exchange system according to some embodiments. As shown in FIG. 3, the system 300 includes a browser 305 that presents content including advertising inventory 307, and generates an ad call to advertising exchange 310. The advertising exchange 310 conducts an auction to present advertisements, in response to the ad call, on a per opportunity basis. As such, the advertising exchange 310 conducts an auction with a plurality of third party agents, represented as third party agents 315, 320 and 330 on FIG. 3. Any number of third party agents may participate on the advertising exchange system. As described above, a third party agent may comprise an integrator network, an advertiser or a network. To conduct an auction, the advertising exchange 310 submits requests for bids to third party agents that qualify to deliver the ad to the inventory location 307. In one embodiment, the eligibility is determined based on one or more business rules, specified by the publisher, a network or the advertiser. In response, the third party agents (315, 320 and 330) respond by generating a bid for the advertising opportunity, or alternatively, generate no bid for the opportunity. The advertising exchange collects the bids, and selects a bid to "win" the auction based on one or more predetermined criteria. An advertisement creative, corresponding to the auction winner, is then delivered to the user browser 305 for display in the inventory space 307.

Figure 4:
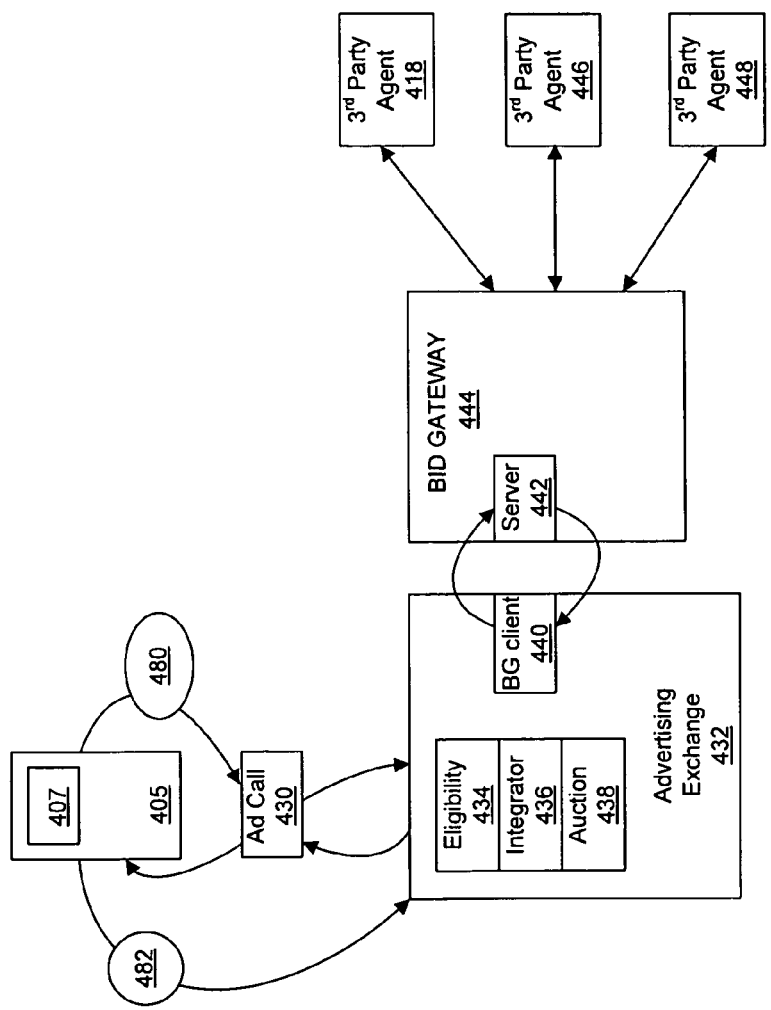
FIG. 4 illustrates another embodiment of an advertisement exchange system.

FIG. 4 illustrates another embodiment of an advertisement exchange system. The system 400 includes a browser 405 that presents content, including advertising inventory 407, and generates an ad call to the advertising exchange 432. For this embodiment, the system 400 includes an advertising exchange 432, a bid gateway 444 and one or more third party agents 318, 346 and 348. As mentioned above, the browser 405 and/or inventory 407 require ads and/or generate requests for the presentation of advertisements to a user at various times. One such type of request is in the form of an ad call 430 to the advertising exchange 432. The ad call 430 generally includes a variety of different types of information. In some embodiments, the ad call 400 may include a conventional type ad call for an ad campaign, for a creative and/or for an advertisement that are supplied by a conventional network entity and/or advertiser. The advertising exchange 432 is further capable of receiving additional types of information and/or requests such as, for example, APEX type information 480, RightMedia type information 482, and/or alternative type ad calls such as federated ad calls that contain additional information and/or complexity.

For this embodiment, the exchange module 432 includes several modules that provide a variety of functionalities such as, for example, an eligibility module 434, an integrator module 436, an auction module 438, and a bid gateway (BG) client module 440.

The eligibility module 434 determines which entities, including integrator networks and/or integrated entities, are eligible to respond to a particular ad call or to receive a request for an ad bid. The determination may be based on targeting information regarding, for instance, the user, the inventory, the browser, and/or the publisher that are the destination of the requested advertisement. The eligibility module 334 preferably receives targeting, bidding, and/or eligibility information from the ad call 330, and passes information regarding the entities eligible to bid for the placement of advertising in response to the ad call. Some additional criteria for eligibility that may be used by the eligibility module 334 includes knowledge regarding which entities (e.g., integrator networks) are enabled to receive a certain volume of bid requests for a certain period of time, and who have not reached their maximum quota of bid requests for the time period, or that have advertisements directed toward certain user segments, for example, of which the particular targeted user is a member of such user segments.

Once eligible entities are determined for bidding, the integrator module 436 communicates the information to the bid gateway 444. As explained more fully below, the bid gateway generates one or more ad bid requests for each eligible entity, such as the third party agents 418, 446, and/or 448. In one embodiment, the integrator module 436 uses a client-server approach, such as via the bid gateway client module 440 and a bid gateway server module 342, to communicate with the bid gateway 444.

The bid gateway 444 further transmits the generated ad bid requests to the appropriate entity(s) such as one or more of the third party agents 418, 446, and/or 448, and waits for responses to the bid request(s). Preferably, the bid gateway 444 waits for only a predetermined period of time (e.g., less than 100 milliseconds) such that the bid request-response process does not add significantly to the overall round trip time for ad call/bid request and/or delivery. A third party agent 418, 446, and 448, such an integrator network, may respond to an ad bid request with a message containing a particular advertisement, and a monetary bid amount for the placement of the particular advertisement with the inventory, in response to the particular ad call for the particular user and/or the particular publisher, at the time of the ad call.

Preferably, the selected integrator networks (e.g., third party agents) respond to the bid request within a predetermined amount of time. In some embodiments, the round trip time for the bid request and the bid response, from the bid gateway 444 to and from each responding eligible entity (e.g., integrator networks) is less than about 100 milliseconds, and in some cases the total round trip time for the ad call and ad delivery and/or presentation is less than about 500 milliseconds, with about a 200 millisecond average.

Alternatively, the integrator network (e.g., third party agents 418, 446, and 448) may respond with a message indicating "no bid," or not respond at all within the allowable time period for response. The bid gateway 444 transmits any ad bids that are within the allowable response period to the integrator module 436. Then, the auction module 438 uses the ad bids to determine a winner among the received bid responses. In one embodiment, the auction module 438 executes a plurality of business rules to select the winning bid. The business rules may use any type of criteria to select a bid, including price of the bid. Accordingly, an advertisement is selected from the received bid responses, and is then delivered and/or served to the inventory location 407, and/or the user of the browser 405.

The advertising exchange 432 may perform a variety of additional or optional functions and/or services. For instance, the appropriate entities may be compensated according to their respective agreements, the various activities of the system 400 may be logged for the exchange.

Figure 5:
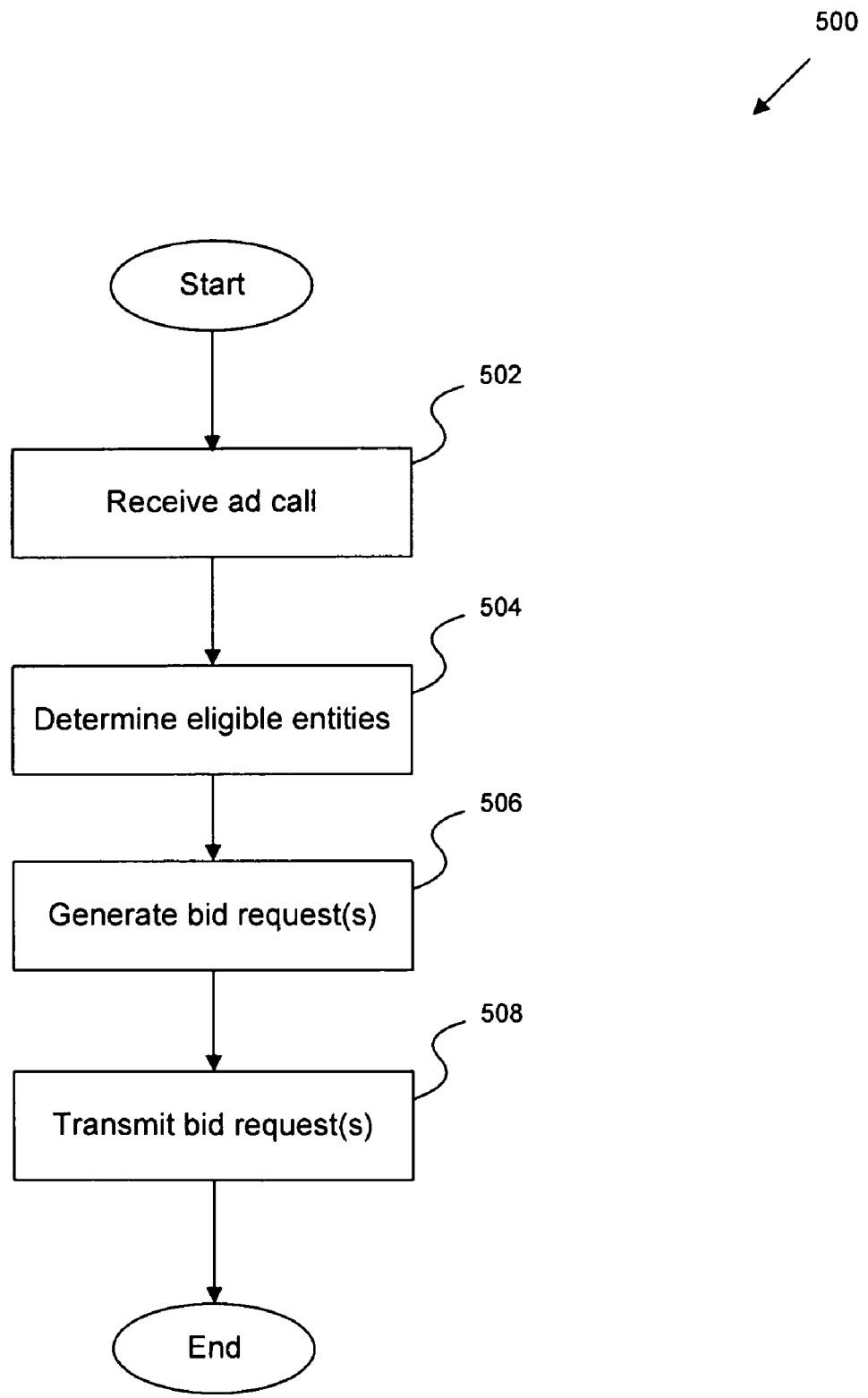
FIG. 5 illustrates a high-level process for generating bid requests per opportunity according to some embodiments.

FIG. 5 illustrates a high-level process for generating bid requests per opportunity according to some embodiments. As shown in FIG. 5, the process 500 begins when an ad call is received (502, FIG. 5). In some embodiments, the ad call is received by an advertising exchange when a user interacts with a web browser such as when the user visits publisher web pages having inventory for the placement of advertisements. In some embodiments, the ad call is a federated type ad call that may be distributed to various entities, including conventional networks as well as integrator networks for integrating third parties into the advertising exchange system. Third party entities that are integrated into the exchange by an integrator network (IN) may be referred to herein simply as "integrated entities" (IE). Generally, several operations are performed when the ad call is received such as, for example, validation that the ad call has a proper format, and/or is received from a reliable source. Moreover, traffic, flow, and/or rate control of many ad calls is performed, and/or various exchange data are looked up (retrieved) such as user and/or browser data by using a user data base (UDB), and the like.

Continuing with the process flow of FIG. 5, a set of eligible entities is determined (1204, FIG. 5). The determination of the eligible entities may be based on the capabilities of the entities, and/or the selected preferences of the entities. For instance, an entity may be eligible to receive a bid request for the particular ad call based on the user targeting needs of the entity. In some embodiments, the advertising exchange effectively utilizes a directed graph. The directed graph defines eligible paths among entities based on one or more criteria. The criteria may specified by an advertiser or an entity (e.g., publisher). For example, the directed graph may specify, between two entities, a path for traffic that originated from a geographical region, such as Los Angeles. For this example, an entity may place a constraint that they are only interested in bidding on traffic from Los Angeles. As such, the entity is only eligible to receive a bid request if the traffic originated from Los Angeles. In addition, the publisher, with the inventory, may define a list of rules that define the criteria for the advertisement. Furthermore, the creative for an advertiser or entity must be compatible with the inventory. For example, the size of the inventory must coincide with the size of the creative. The publisher may further limit the type of the creative, such as specifying that the creative can't be flash. Eligibility may further be based on a competitive exclusion, or the rules of the exchange. In one implementation, a module of the advertising exchange module determines eligibility.

Once eligible entities are determined, bid request(s) are generated for the eligible entity(s) (506, FIG. 5). In some embodiments, bid requests are customized for each eligible entity. The bid request may further include additional information to aid the eligible entities in determining how to respond to the bid request (e.g., whether to bid, how much to bid, which advertisement(s) to select for presentation). The information may include, for example, details regarding the publisher, the inventory, the browser, and/or the user, including segment data, and may further be retrieved from a user database, or another source.

Once the bid request(s) are formed, the bid request(s) are transmitted to the eligible entities (508, FIG. 5). Some embodiments use a bid gateway to generate and/or transmit the bid requests. In some embodiments, traffic management and/or rate limiting is further implemented at 1206. For example, bid requests are preferably dropped that are intended for destinations (e.g., integrator networks) having expired leases, and/or that exceed a user setting for queries within a time period (e.g., queries per second).

Figure 6:
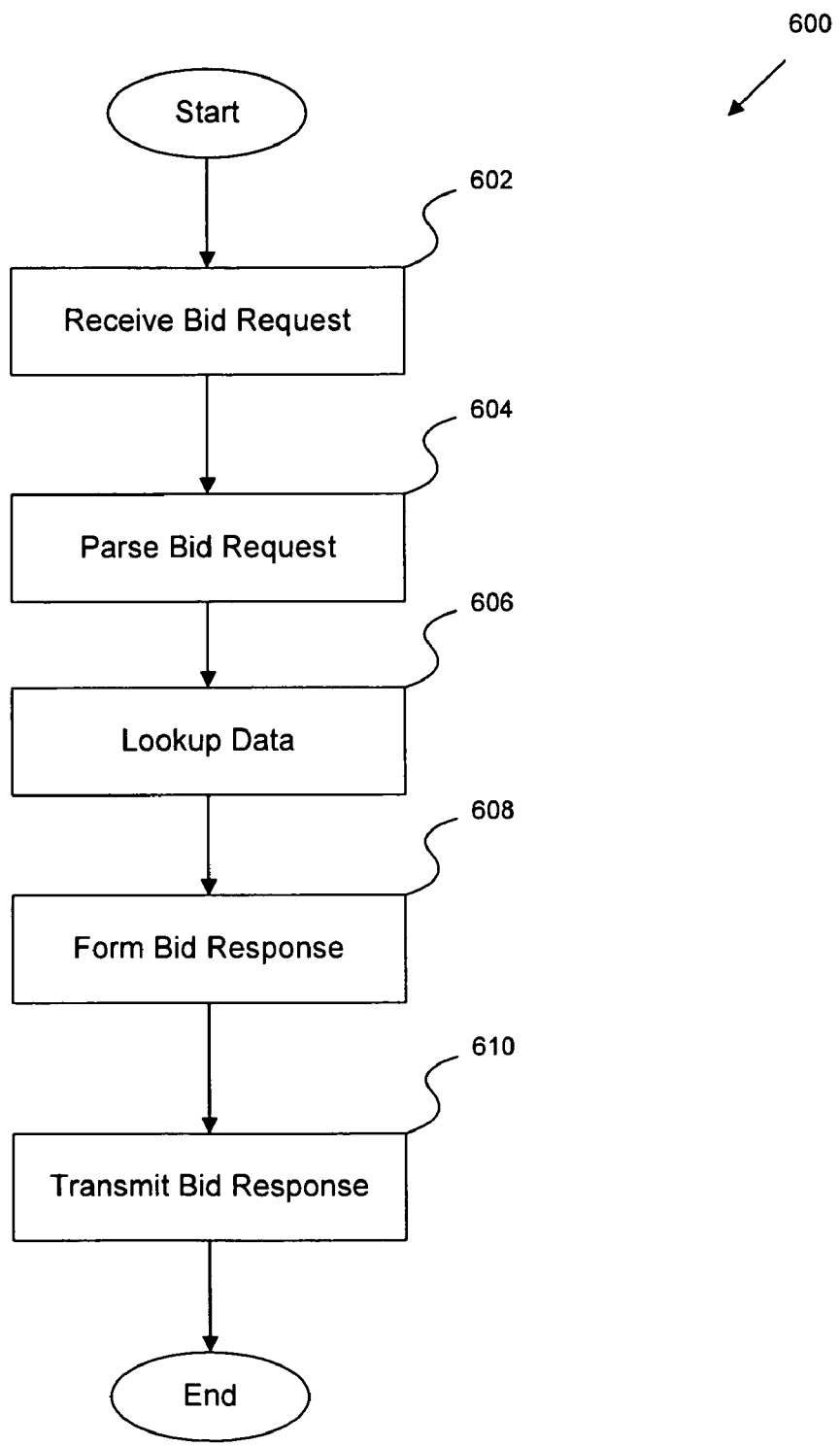
FIG. 6 is a flow diagram illustrating a process for generating a bid response in accordance with some embodiments.

FIG. 6 is a flow diagram illustrating a process for generating a bid response in accordance with some embodiments. As shown in FIG. 6, the process 600 begins when a bid request is received at an integrator network or third party agent (602, FIG. 6). In some embodiments, the bid request is transmitted to an integrator network from a bid gateway located, for example, within a collocation facility. In some embodiments, the bid request includes various data regarding a publisher, inventory, a user, and/or a browser that are relevant to the placement of advertising. The bid request is parsed for the relevant information (604, FIG. 6). The information is parsed from the bid request to look up data that the recipient of the bid request may have available, such as data for targeting of the inventory, the user, and/or the browser (606, FIG. 6). The data may be available to an integrator network via its own internal storages and/or via one or more third parties (integrated entities).

The third party agent or integrator network forms a bid response (608, FIG. 6). The bid response may include a selected advertisement and/or creative, and a selected bid for the placement of the ad with the publisher, inventory, user and/or the browser. In some embodiments, the third party agent or integrator network makes the selection based on the information sent from the advertising exchange. Further, some bid responses further include additional useful information, such as, for example, accounting data, targeting information (e.g., behavioral type targeting information), and/or a mapping call and information to select a creative. Once the bid request is formed, the bid response is transmitted back to the advertising exchange (610, FIG. 6). The bid response is transmitted by one or more eligible entities (e.g., integrator networks) to a bid gateway for selection of a winning bid and/or advertisement. For example, an integrator network may transmit a bid response on behalf of one or more third parties, or integrated entities.

Figure 7:
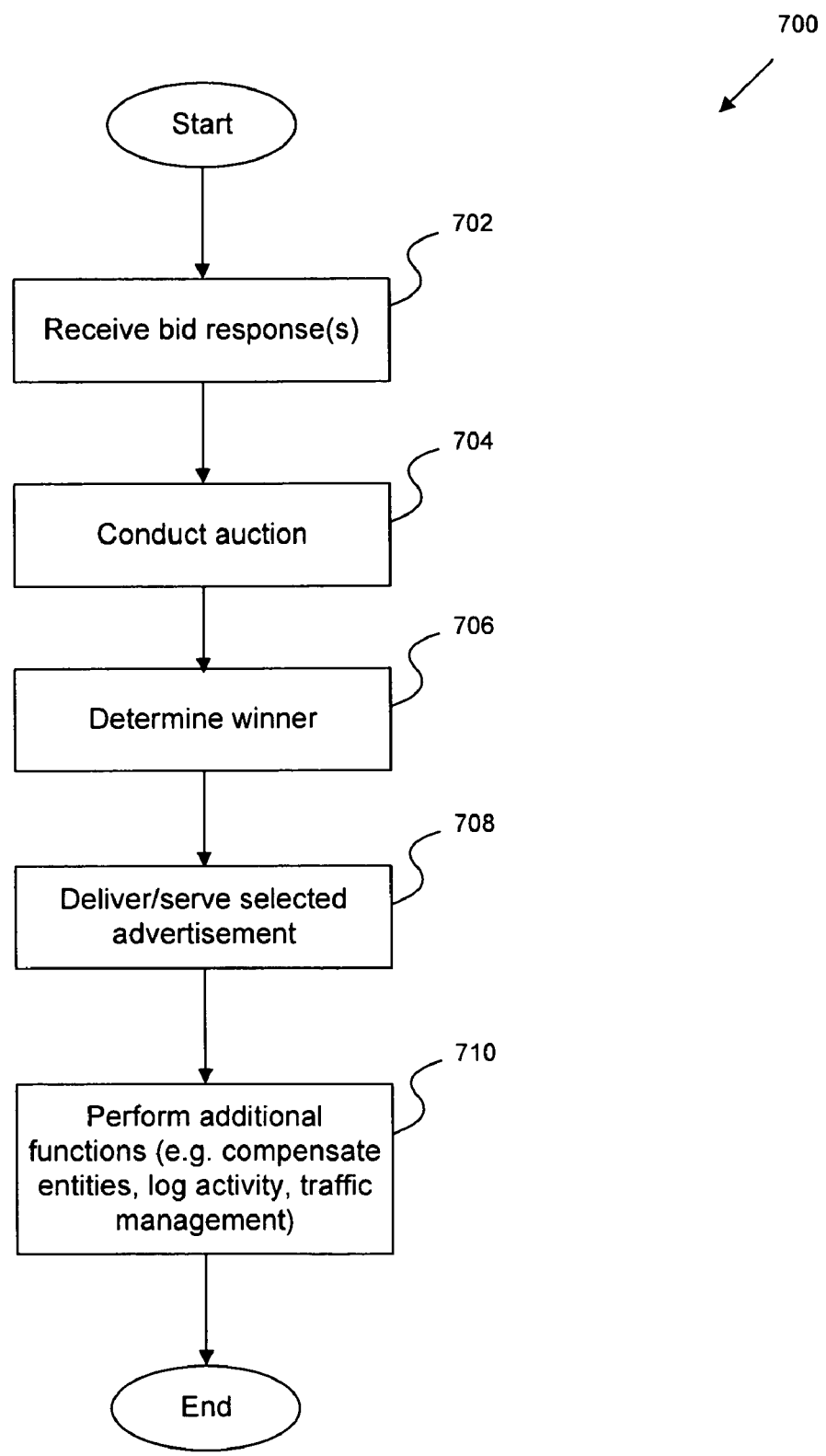
FIG. 7 is a flow diagram illustrating a process for selecting a bid and/or advertisement.

FIG. 7 is a flow diagram illustrating a process for selecting a bid and/or advertisement. As shown in FIG. 7, the process begins when one or more bid response(s) are received at the advertising exchange (702, FIG. 7). In some embodiments, bid responses are received from an integrator network by a bid gateway. In these embodiments, the bid response(s) are preferably received within a predetermined amount of time. Bid responses arriving outside of the predetermined time window are generally not considered. Then, an auction for the advertising opportunity is conducted (704, FIG. 7). Some embodiments may perform checks and/or validation of the bid response. In some embodiments, a bid response comprises one or more of a monetary bid amount, an associated advertisement or creative, accounting information, statistical data, targeting (e.g., behavioral targeting) information, and/or a mapping call. Some bid responses may be excluded and not considered for various reasons such as invalidity, incompleteness, lateness, and/or irrelevance. A winner is determined from selected (valid) bid responses (706, FIG. 7). The winner may be the highest bid, however, other criteria may be used, such as relevance, and/or combinations thereof, for example.

After a winning bid and/or advertisement are determined, a selected advertisement is optionally delivered, served, and/or presented (708, FIG. 7). Serving the advertisement typically involves placing the advertisement with an inventory location of a publisher for presentation to a user of a browser who is visiting the publisher's web page having the inventory, for instance. Further optionally, additional operations or functions are performed, such as, for example, compensation of the appropriate entities, logging activity, traffic management, and the like (710, FIG. 7).

Figure 8:
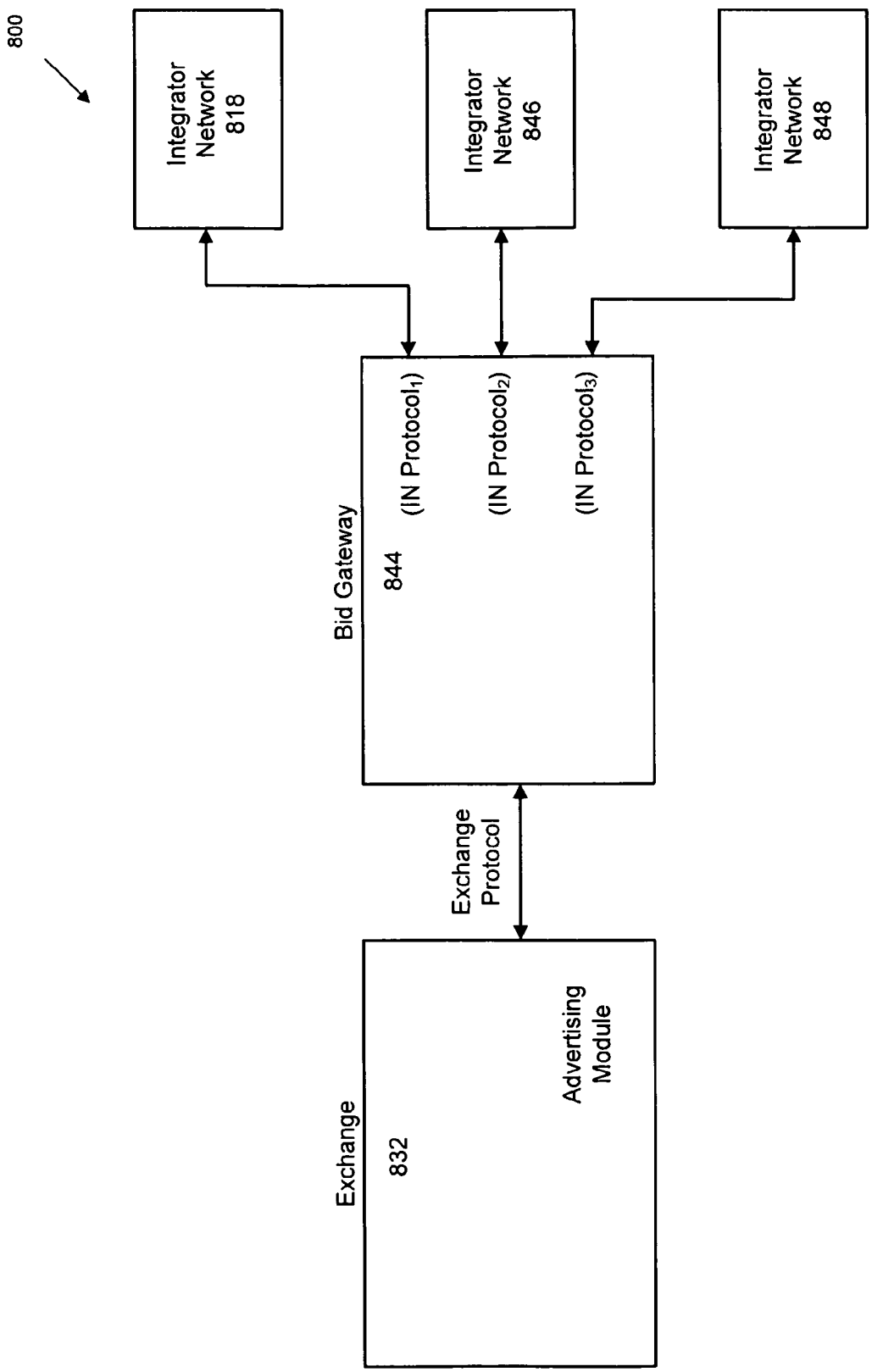
FIG. 8 is a block diagram illustrating one embodiment for implementing a bid gateway in an online advertising system.

FIG. 8 is a block diagram illustrating one embodiment for implementing a bid gateway in an online advertising system. For this embodiment, the online advertising system includes an advertising exchange module 832 coupled to a bid gateway 844. In turn, bid gateway 844 couples third party recipients to the online advertising system, such as integrator networks 818, 846 and 848. As shown in FIG. 8, the advertising exchange module 832 communicates with bid gateway 844 via an exchange protocol. Preferably, the exchange protocol is a highly efficient protocol tailored to the specific messaging format of the advertising exchange module and the bid gateway. The bid gateway 844 communicates with third party recipients (e.g., integrator networks 818, 846 and 848) using various network protocols. For the example of FIG. 8, bid gateway 844 communicates with integrator network 818 via "$Protocol_1$", communicates with integrator network 846 via "$Protocol_2$", and communicates with integrator network 848 via "$Protocol_3$."

By implementing an architecture of the online advertising system that comprises a bid gateway, the network protocols of the auction engine (e.g., advertising exchange module) is independent of network protocols used to transmit bid requests and bids between the third party recipients and the bid gateway. In addition, the bid gateway architecture insulates the location information of third party recipients from the advertising exchange module.

In some embodiments, the input to the bid gateway comprises a message that identifies an opportunity and the third party entities eligible to bid on the opportunity. This message is expressed in the language of the exchange protocol. In response to the message, the bid gateway 844 stores the opportunity ID and information on the eligible entities. In some embodiments, the bid gateway 844 stores this data in shared memory for access by multi-processors, as described below. The bid gateway 844 configures a bid request message, and transmits the bid request message to the third party entity using the protocol of the third party entity.

The bid gateway architecture further allows for customization of communications, including information and the protocols, between the online advertising system and third party entities. For example, a third party recipient (e.g., integrator network) may desire to receive certain marketing or targeting information with the bid request, while another third party recipient may desire to receive different marketing or targeting information, or receive no targeting information with the bid request at all.

The bid gateway architecture permits the online advertising system to scale in size. Specifically, the server architecture for the advertising exchange module 832 may be expanded independent of the cluster of servers used to implement the bid gateway 844.

Figure 9:
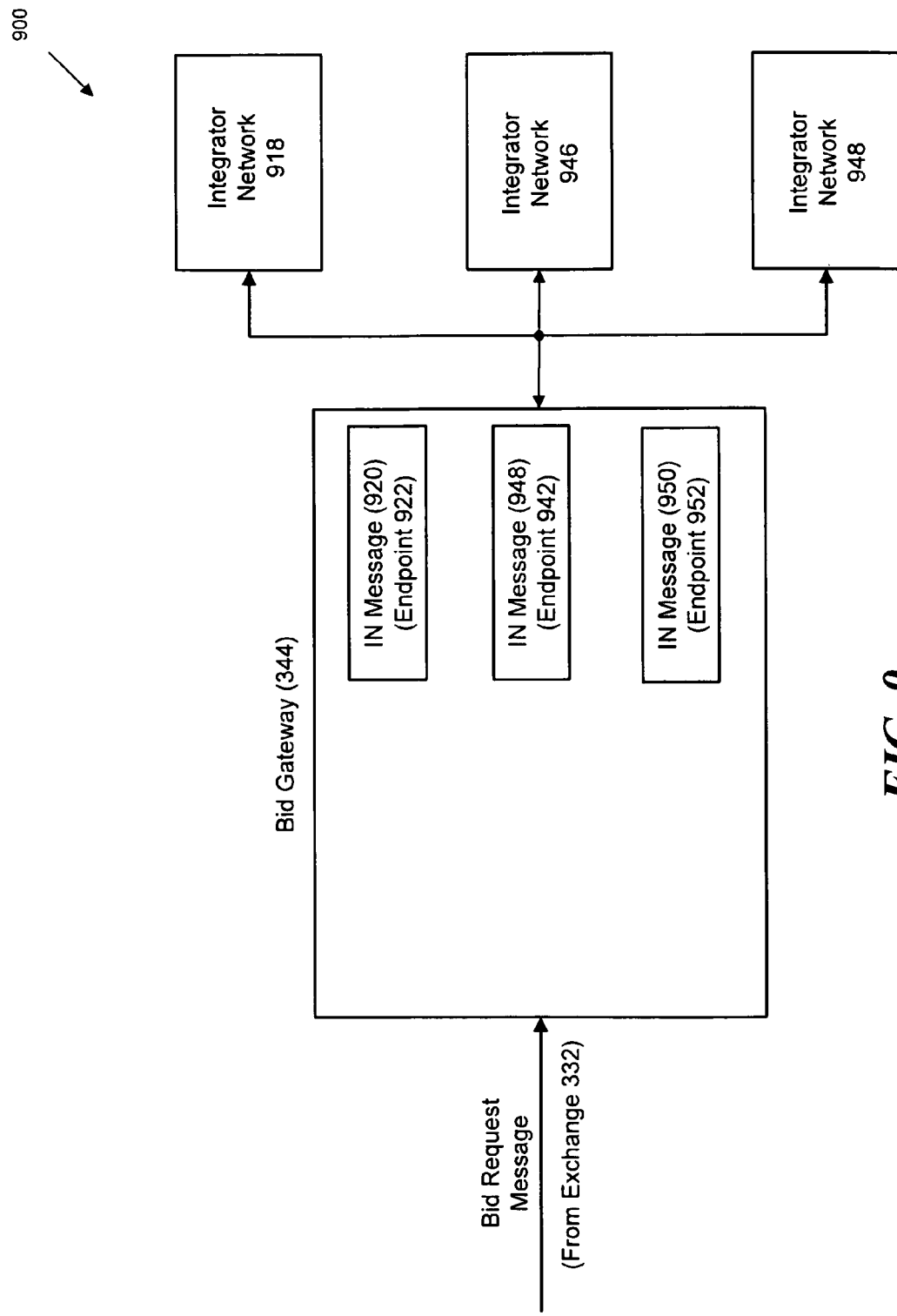
FIG. 9 is a block diagram illustrating some information stored and used by the bid gateway.

FIG. 9 is a block diagram illustrating some information stored and used by the bid gateway. As shown in FIG. 9, the bid gateway 944 receives a bid request message from the advertising exchange module. The bid gateway 944 stores, for each third party recipient, a message format and an endpoint location. For example, the bid gateway 944 stores message format 920 and endpoint 922 for integrator network 918, message format 948 and endpoint 942 for integrator network 946, and message 950 and endpoint 952 for integrator network 948. Using this configuration, each third party entity may customize a message suitable for that entity. In some embodiments, a traffic manager user interface permits a third party entity to set the endpoint, such as a URL address, for message transmission. For these embodiments, a process runs on the bid gateway to read data from the traffic manager user interface and to update the third party information at the bid gateway.

Figure 10:
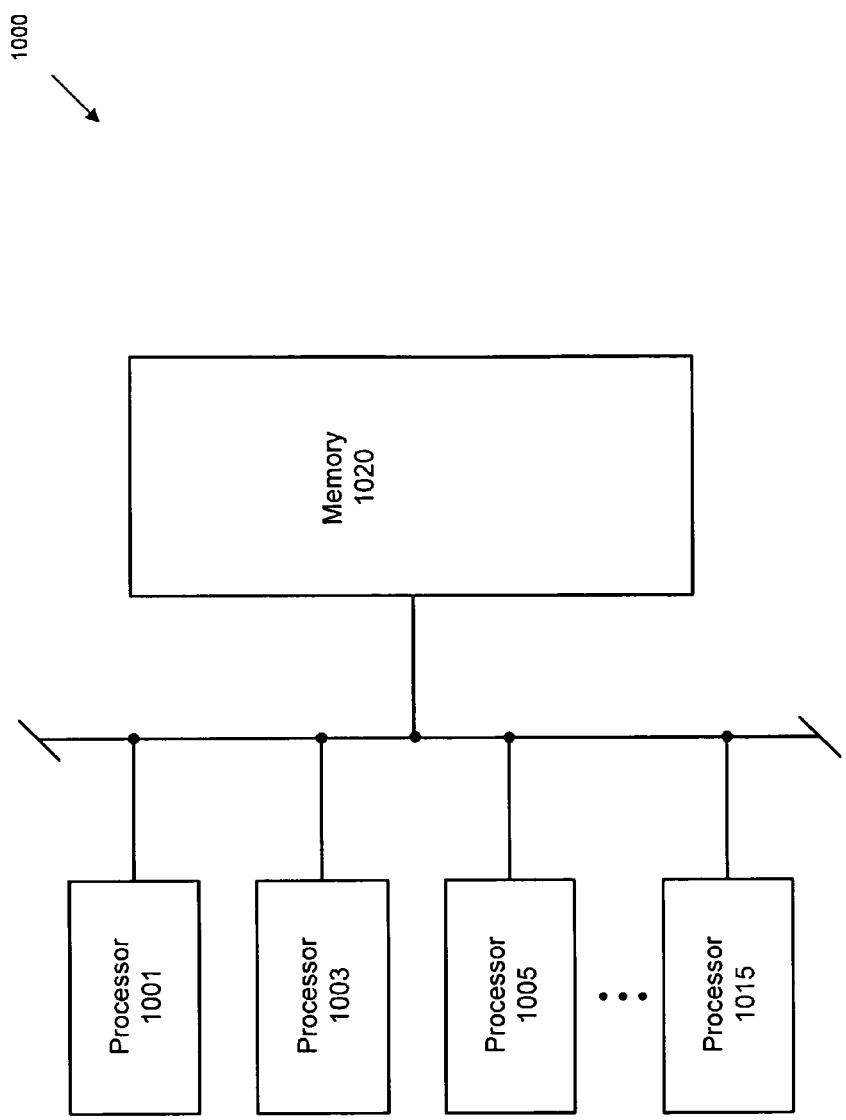
FIG. 10 is a block diagram illustrating a computer architecture for the bid gateway in accordance with some embodiments.

FIG. 10 is a block diagram illustrating a computer architecture for the bid gateway in accordance with some embodiments. For these embodiments, the bid gateway operates on one or more multi-processor servers. The multiprocessor architecture permits efficient execution of bid requests and bid responses. As shown in FIG. 10, the exemplary server includes processors 1001, 1003, 1005, and 1015. As illustrated in FIG. 10, the bid gateway is implemented with any number of processors. Also, as shown in FIG. 10, the processors have access to shared memory 1020. In some embodiments, each processor conducts operations for a single third party recipient. As such, when processing bid requests for an opportunity for a third party recipient, the operation for each third party recipient is conducted in parallel using the multi-processor architecture. The information, used to configure messages to the third party recipients as well as transmit the messages to third party recipients, is stored in the shared memory 1020.

Figure 11:
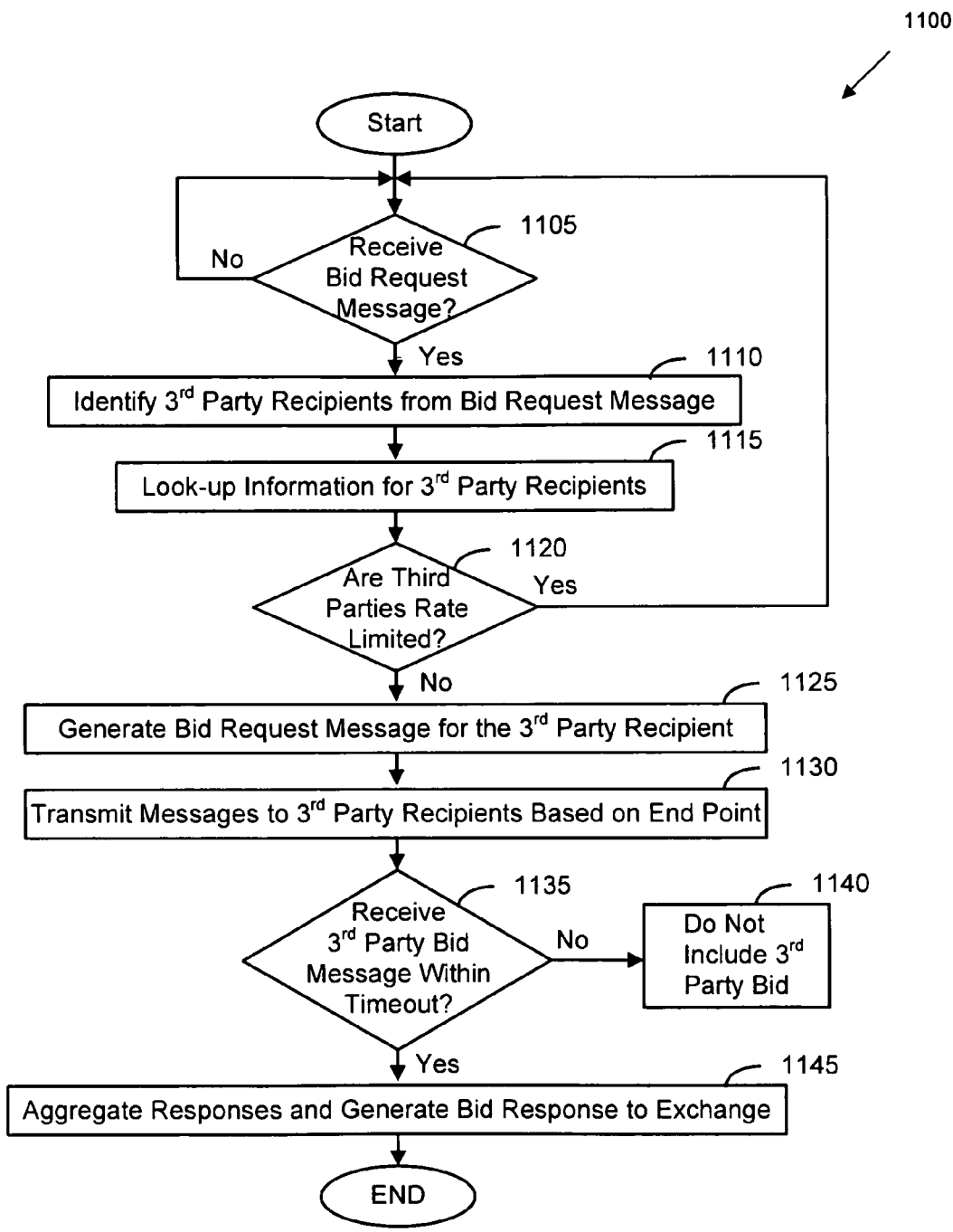
FIG. 11 is a flow diagram illustrating one embodiment for processing in the bid gateway.

FIG. 11 is a flow diagram illustrating one embodiment for processing in the bid gateway. The process is initiated when the bid gateway receives a bid request message from the advertising exchange module (1105, FIG. 11). If the bid gateway receives a message, the bid gateway identifies third party entities from the bid request message (1110, FIG. 11). Also, the bid gateway looks-up information for third party recipients, such as message formats, endpoint locations, and information to include in the message (1115, FIG. 11). If third party recipients are rate limited, such that the third party recipients have exceeded their rate of bid requests, then the bid gateway does not transmit a bid request to those third party recipients (1120, FIG. 11). Alternatively, if the third party recipients have not exceeded their rate of bid requests, then the bid gateway generates a bid request message for the third party recipients (1125, FIG. 11). The bid request messages are then transmitted to the third party recipients based on their endpoint locations (1130, FIG. 11). If the bid gateway does not receive a bid from a third party within the time allowed, then a timeout occurs and a bid from that third party recipient is not considered (1135 and 1140, FIG. 11). If the bids are received within the time limit, the bid gateway aggregates the bid, and generates a bid response to the advertising exchange module (1145, FIG. 11).

The division between the functions executed by the advertising exchange 432 and the functions executed by the bid gateway 444, via a client-server system, allow for scalability of the advertising exchange 432 and/or bid gateway 444. For instance, the advertising exchange 432 may be implemented by using a cluster and/or a large numbers of machines (e.g., 6000 machines, or computers), while the bid gateway 444 may be implemented by using several hundred machines (e.g., 200 machines, or computers), potentially for serving millions of requests and/or terabytes of data, or more, per second.

Figure 12:
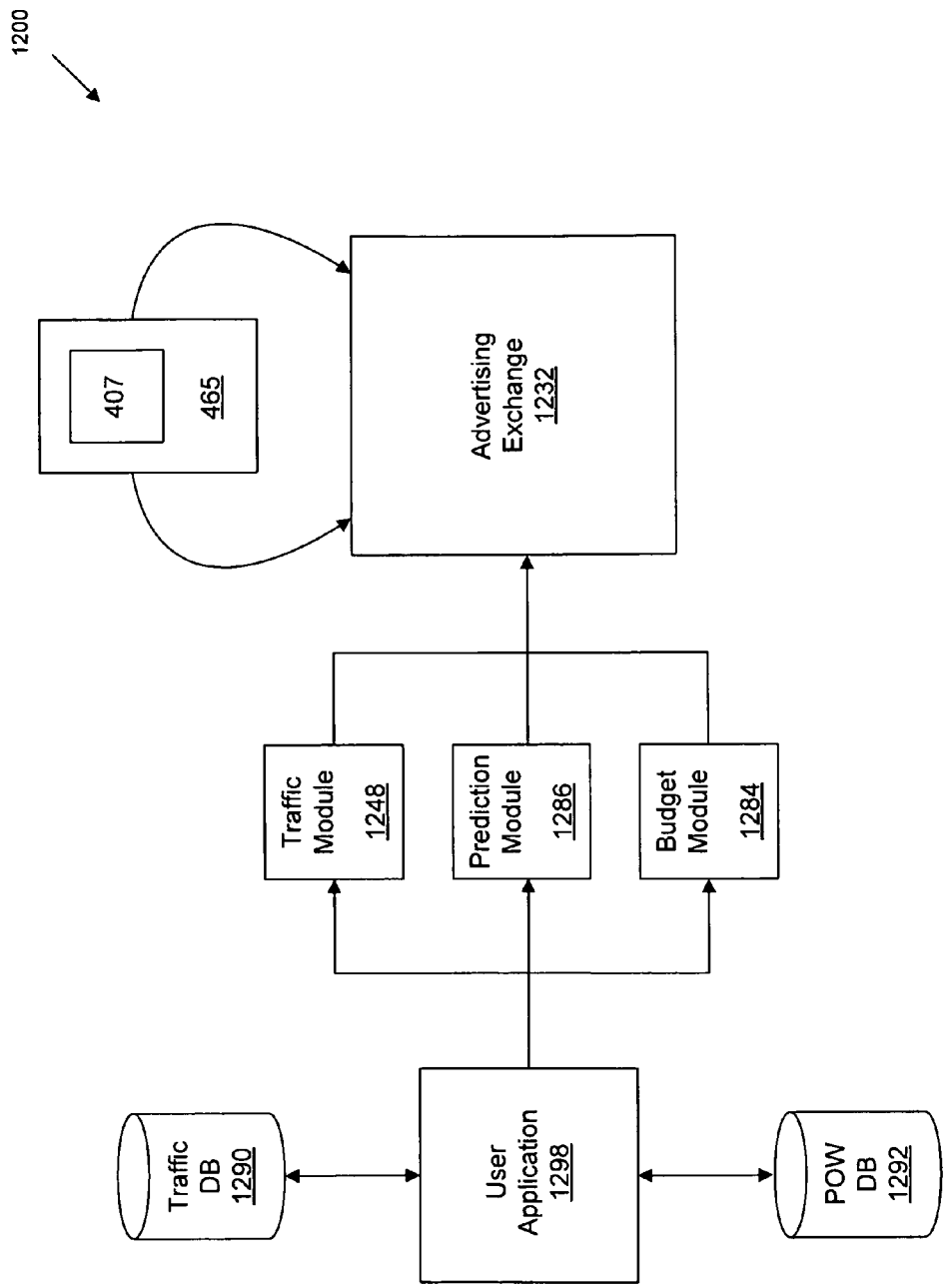
FIG. 12 illustrates an exchange system 1200 of some embodiments in further detail.

Some embodiments of the advertising delivery system include additional advantageous components. FIG. 12 illustrates an exchange system 1200 of some embodiments in further detail. As shown in FIG. 12, some embodiments 1200 further include additional modules coupled to the advertising exchange 1232, such as a traffic module 1288, a prediction module 1286, and a budget module 1284. In some cases, these modules are implemented as databases and/or data storages. The budget module 1284 contains information about how much entities on the exchange have and/or wish to spend, or their budget for various activities on the exchange, such as for the placement of their advertisements. The traffic module 1248 has information regarding historical traffic patterns on the exchange, and the prediction module 1286 provides information regarding the probable future patterns on the exchange such as, for example, where impressions are likely to be served, where clicks are likely to occur, where certain user segments may have activities, where certain targeting is likely to produce results, and the like.

The advertising exchange 1232, and additional components and modules preferably are accessible by using one or more customer and/or application interfaces. FIG. 12 further illustrates a user application 1298. In general, the user application 1298 permits a user of the advertising exchange to interface with the advertising exchange. For example, a user, through user application 1298, may access the budget module 1284, the prediction module 1286, and/or the traffic module 1288. The customer and/or network access of the applications 1294, 1296, and/or 1298 generally includes one or more user interfaces, including graphical user interfaces, web services including enterprise services, separated value, and/or batch access. In some embodiments, the user applications may be similar to those provided on the Advertising Publishers Exchange ("APEX") or the Right Media Exchange. The user application 1298 may use its own data storage such as, for example, a traffic database 1290 and an operation warehouse (POW) 1292, respectively, for accessing and/or interacting with the components of the exchange 1232.

Figure 13:
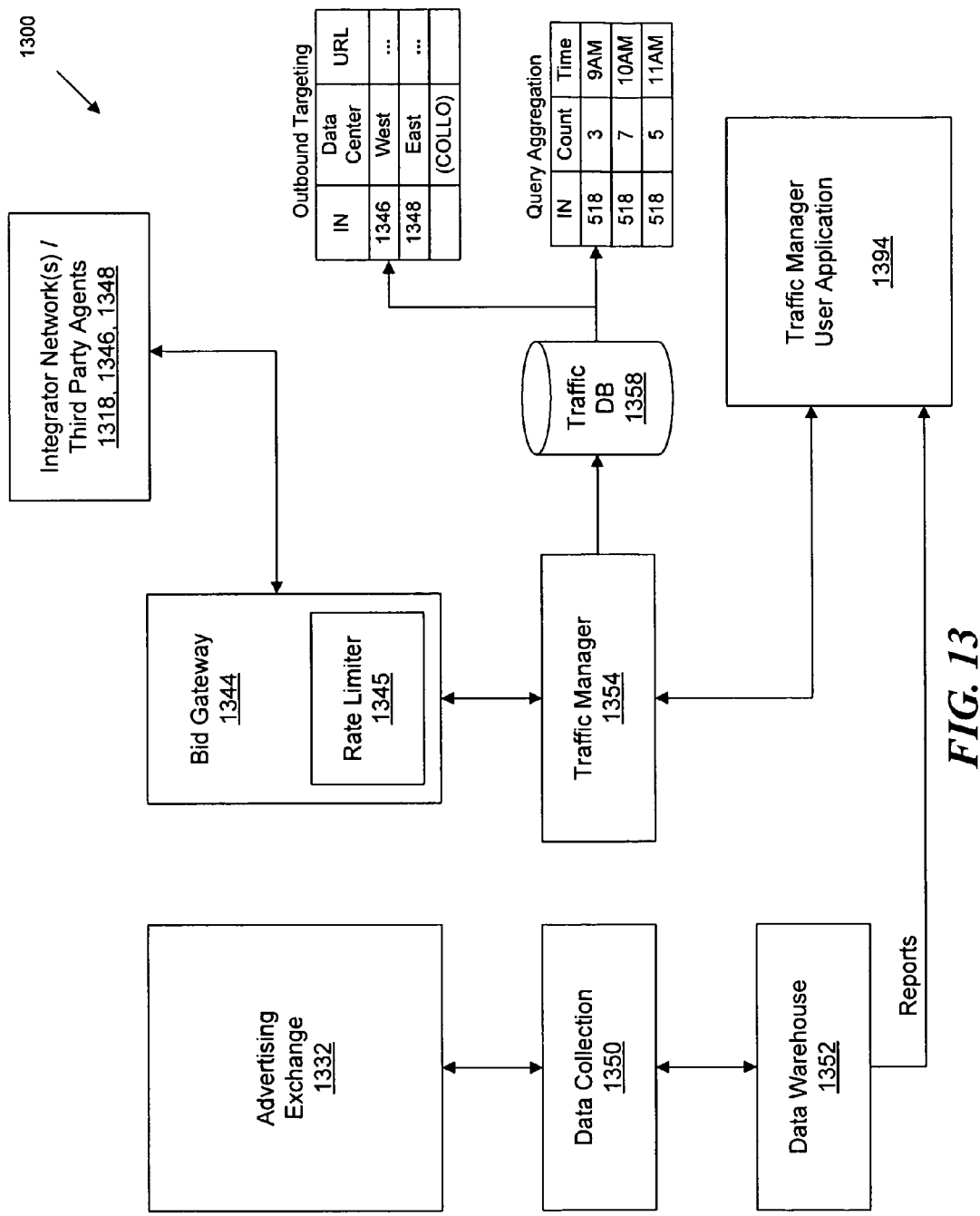
FIG. 13 illustrates another embodiment of an advertising exchange system with additional features.

Traffic Management For the Online Advertisement System:

FIG. 13 illustrates another embodiment of an advertising exchange system with additional features. For this embodiment, the advertising system 1300 includes a data collection 1350, coupled to the advertising exchange 1332, a traffic manager 1354, coupled to the bid gateway 1344, and a data warehouse 1352, coupling the data collection 1350 to the traffic manager 1354. These components are advantageously used to track and/or control the activities on the advertising exchange such as, for example, to track the number and activities of the eligible integrator networks or third party agents, to track the number of bid requests that are sent, to set the rate at which bid requests are delivered to each entity, to set the amount of leased time each entity or agent has for receiving bid requests, and the like. These components and features are further described below.

Separately, or in conjunction with these applications, a traffic manager (TM) user application 1394 provides, to users (e.g., integrator networks and third party agents) a user interface application to permit them to set functionality and acquire information from the traffic manager 1354. For example, in some embodiments, the traffic manager user application permits users to set a desired rate to receive bid requests, to generate reports regarding the number of bid requests sent, received and timed out, a lease period for which the user desires to receive bid requests from the advertising exchange and to set an endpoint location (e.g., URL) that specifies a location to send bid requests.

In some embodiment, customers or users of the applications and/or the exchange system, such as network type entities, integrator networks and third party agents, may log into and/or access selected applications and/or interfaces to perform various administrative tasks such as choosing options, configurations, and/or settings. The customers may also retrieve information regarding activities on the exchange such as, for example, accounting, statistics, targeting, query aggregation, and/or other information. For example, the traffic manager user application 1394 provides one or more of rate limiting, querying of accounting or statistics, and/or outbound targeting functions.

Preferably, the integrator networks 1218, 1346, and 1348 include a variety of different types and sizes of entities. For instance, these entities may include large sophisticated network operators, and further include smaller niche type players such as a mom-and-pop type operation, or a researcher in a research institution. Preferably, the system 1300 scales to the needs of each entity, accordingly. In one example, the customer entities are provided client-managed throughput, and/or traffic manager features.

As shown in FIG. 13, the bid gateway 1344 includes a rate limiter 1345. The rate limiter 1345 controls the rate of transmission and/or delivery of bid requests to each eligible entity coupled to the bid gateway 1344. The traffic manager 1354 sets the user requested bid rate in the rate limiter 1345 based on the rate set by the user from the traffic manager user application 1394.

Figure 14:
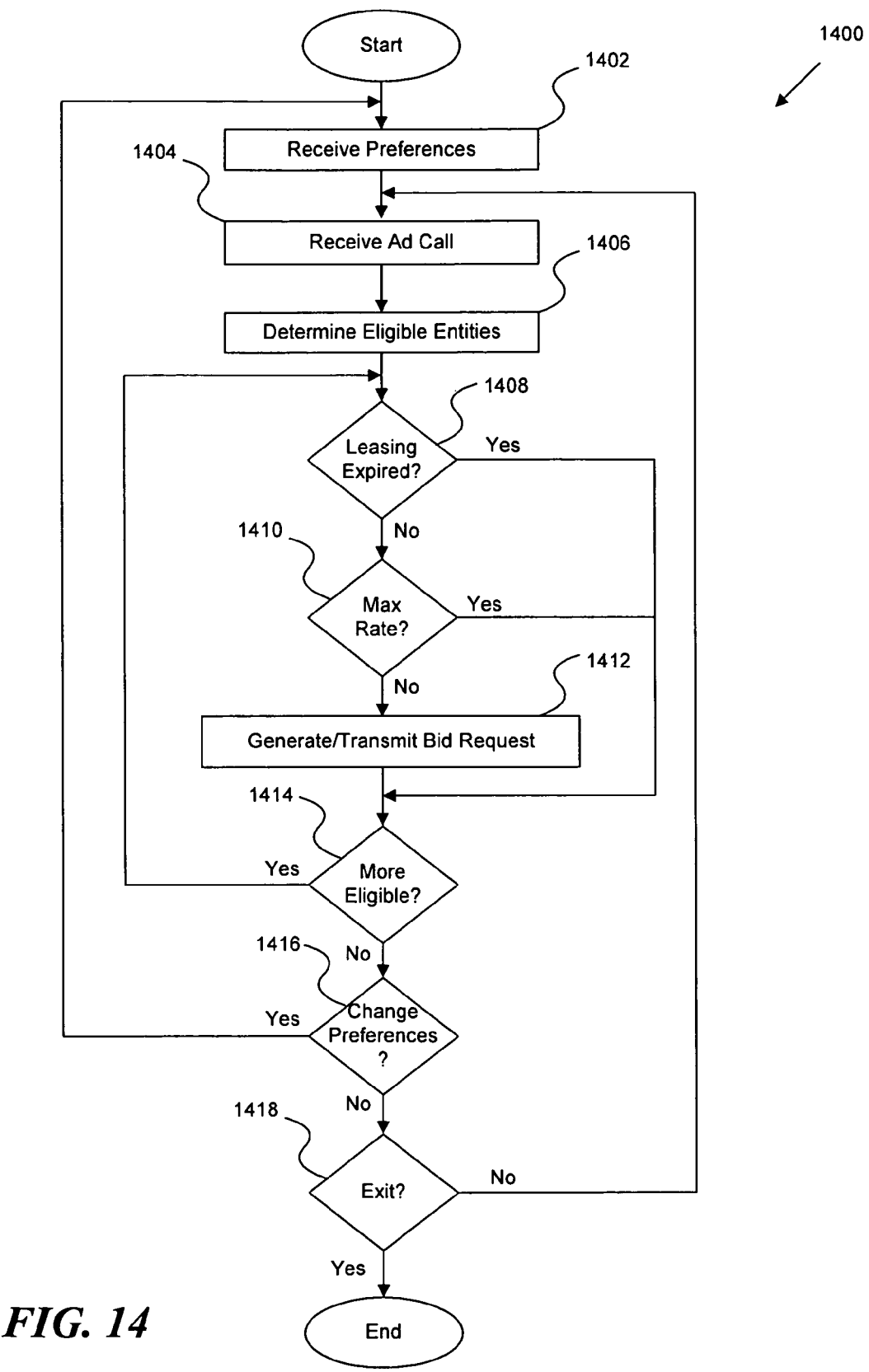
FIG. 14 is a flow diagram illustrating a process for rate limiting and/or customer managed throughput according to some embodiments.

FIG. 14 is a flow diagram illustrating a process for rate limiting and/or customer managed throughput according to some embodiments. As shown in FIG. 14, a set of preferences are received at the advertising exchange for controlling and/or managing traffic, such as a customer defined rate of bid requests that are transmitted to the customer of an advertising exchange system (e.g., an integrator network) (1402, FIG. 14). In some embodiments, the preferences are configured by the customer, such as by using a number of interfacing techniques, including enterprise services, web services, graphical user interfaces, delimited values (CSV), and/or batch/updating services. The preferences may include a metric to rate limit. The rate limit preference, expressed in queries per second, sets forth the maximum number of bid requests the integrator network desires to receive. The preferences may further include the leasing time window that defines a time during which the integrator network wishes to receive bid requests, before lease renewal is required.

Once the set of preferences are established, then one or more ad calls are awaited and/or received (1404, FIG. 14). When an ad call is received, a group of eligible entities are determined (i.e., entities that are eligible to place the ad) (1406, FIG. 14). As shown in block 1408, some embodiments determine whether an entity's lease has expired. If the lease has expired without present renewal, then additional eligible entities are processed. If the lease has not expired, then whether the maximum throughput for the entity has been reached is determined (1410, FIG. 14). For example, if an integrator network has a bid request preference of 10,000 queries per second, and fewer than that threshold of bid requests have been transmitted to the integrator entity this second, then bid request(s) are generated and/or transmitted to the integrator network (1412, FIG. 14). Otherwise, when the threshold is exceeded, the bid request is not generated and sent. In addition, a variety of accounting, tracking, log, and/or statistical information are preferably recorded. Then, at block 1414, a determination is made whether more entities need to be checked for eligibility, and/or whether there are more eligible entities. If there are more entities to be checked, then the process returns to the block 1408. Otherwise, the process transitions to the block 1416, where there is a check for changed preferences. If the preferences are changed at the block 1416, then the process returns to the block 1402. Otherwise, the process transitions to the block 1418. At block 1418, an exit condition is checked. If there is an exit condition at the step 1418, then the process concludes. Otherwise, the process returns to the step 1404 to await and/or receive ad call(s).

Figure 15:
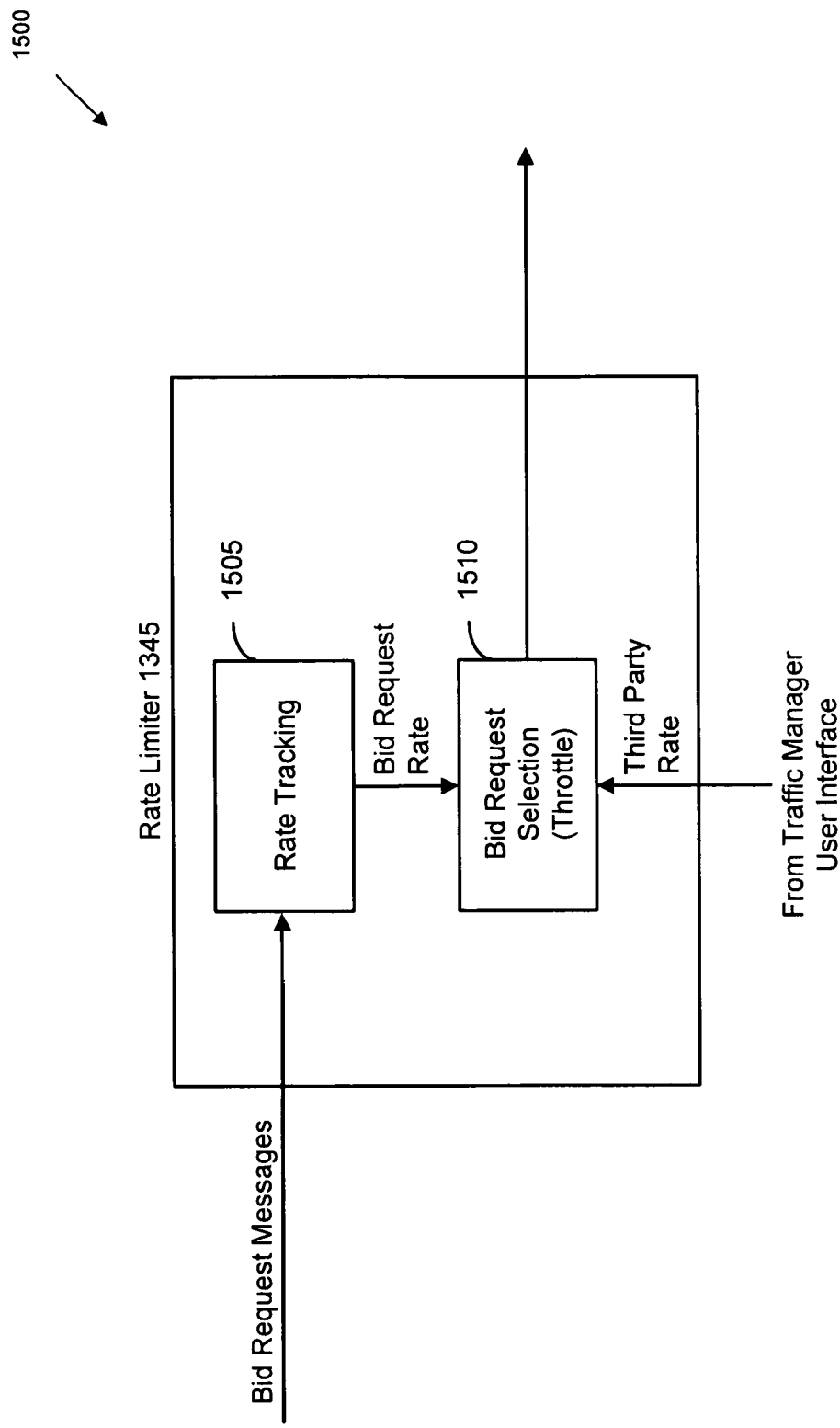
FIG. 15 is a block diagram illustrating a rate limiter for bid requests in accordance with some embodiments.

FIG. 15 is a block diagram illustrating a rate limiter for bid requests in accordance with some embodiments. For this embodiment, rate limiter 1345 comprises rate tracking 1505 and bid request selection (e.g., throttle) 1510. In general, rate-tracking 1505 determines the rate at which bid requests are generated, by the advertising exchange module, for a particular third party recipient. Using a historical bid request rate and a desired bid request rate, set by the third party user, as inputs, bid request selection 1510 matches these input parameters and selects bid requests for transmission to third party recipients.

The rate limiter operates in a system that transmits bid requests to third party recipients on a per opportunity basis. It is not essential that the third party recipients receive a bid request for each opportunity. Thus, opportunities may be dropped. The rate limiter operates in accordance with these assumptions and principles.

In one embodiment, the rate limiter 1345 is time-based, as opposed to quantity based. For example, if a selection system is purely quantity based, then the output may select the maximum quantity desired in a very short period of time (e.g., 1000 bid requests may be dispensed in just a few minutes when the third party recipient requests 1000 bid requests per hour). Instead, in a time-based system, the bid request selection module 1510 spreads out the transmission of bid requests to third party recipients over time.

The rate tracking 1505 measures the rate or speed at which bid requests are received at the bid gateway for each third party recipient. In some embodiments, rate tracking 1505 uses a histogram to track the number of bid requests for a third party recipient. For example, in some embodiments, rate tracking 1505 sets-up a "bin", and tracks the number of bid requests by counting the bid requests in the bin over a specified period of time. In other embodiments, rate tracking 1505 measures the time required to receive a predetermined number of bid request messages for a third party recipient. Under this approach, rate-tracking 1505 varies the size of a time window, but maintains an equal number of bid requests within the time window. Any rate-tracking scheme that provides historical data, such as a histogram, may be used without deviating from the spirit or scope of the invention.

Bid request selection 1510 selects bid request messages for transfer to the third party recipients. For example, if the third party recipient has set the desired rate to 10 queries per second ("QPS"), and the rate tracking indicates a historical pattern of 100 bid requests per second (QPS), then bid request selection 1510 selects one out of every 10 bid request messages to transmit to the third party recipient. In some embodiments, the bid request selection 1510 uses a probabilistic filter. For these embodiments, the bid request selection 1510, in essence, flips a coin to determine whether to send the bid requests based on the historical rate and the desired rate set by the third party recipient. In some embodiments, the probabilistic filter is averaged over a time window. If the time window is set relatively large, then the third-party recipient may potentially get bid requests that are not evenly spread over the time window. Alternatively, if the time window for the probabilistic filter is set too small, then too many computational resources may be required. In some embodiments, the probabilistic filter may set a time window between 5 and 15 minutes. One advantage in using a probabilistic filter is that it allows distributed control, but still provides a predictable system operation. As such, the bid gateway may be implemented over several servers, but the aggregate behavior of the entire system is predictable.

In some embodiments, the traffic manager implements reporting functions. In general, the reporting functions provide a record or log of network transactions between the online advertising system (e.g., bid gateway) and the third party recipients (e.g., integrator networks). In some embodiments, the reporting data or log records 1) error in transmissions, 2) timeouts of bid requests to third party recipients, 3) successful queries (bid requests sent to third party recipients that responded with a bid in the requisite time), 4) the time of the transmissions and 5) the location of the facility that conducted the transactions. The traffic manager may record other network transactions between the online advertising system and third-party recipients without deviating from the spirit or scope of the invention.

During operation of the system 1300, the data collection 1350 provides information regarding the type and volume of activities on the exchange, such as by the advertising exchange 1332 and/or of the system 1300. This data may be further collected or aggregated in a data warehouse 1252, which is coupled to, and provides data to, the traffic manager 1354 and the traffic manager user application 1394. For example, a user of the system may generate reports regarding activity, such as bid requests and bid responses, through data collected in data collection 1350 a data warehouse 1352 and accessed through traffic manager user application 1394. In the traffic manager 1354, the data is further available for access and/or use by applications and/or modules coupled thereto (e.g., by the traffic manager user application 1394, the bid gateway 1344, the traffic manager database 1358, and the like).

As shown in FIG. 13, the outbound targeting information may include the data center (e.g., collocation facility) of the bid request, and/or the URL of the destination for the ad of a selected bid response. For example, the outbound target destination may include the west coast, the east coast, Los Angeles, or San Francisco, as examples.

Another type of information that is used, in addition to the outbound targeting information, is query aggregation type information. As shown in FIG. 13, the query aggregation information, for this example, includes a count of the number of transmitted bid requests per entity. For this example, the system 1300 has transmitted to the integrator network(s)/third party agents 1218, three bid requests up to the hour of 9 AM, seven bid requests from 9 AM to 10 AM, and five bid requests from 10 AM to 11 AM. The information, however, may be formatted in various ways other than the illustrated log format, and/or may include alternative information, such as a number of bid responses by the entity, a number of successful bids by the entity, a number of placed advertisements, the bid price or placement cost for the placed advertisements, and/or the accounting of the payout for each placement.

In some embodiments, the traffic manager 1354 may be implemented on an application server, separate from sever(s) that implement the bid gateway. The traffic manager may use data storage, such as a traffic manager database 1358. In a particular implementation, the traffic manager database 1358 provides for the storage and retrieval of query aggregation information, rate limit preferences of users (e.g., integrator networks), outbound targeting information, and the like.

As discussed above, a customer may access a traffic manager user application 1394 to configure a variety of preferences for the exchange, and/or obtain a variety of information regarding activities on the exchange. More specifically, an integrator network (e.g., integrator network 1318) advantageously selects rate limiting preferences for the transmission of bid requests transmitted from the bid gateway 1344 to the integrator network/third party agent 1318. A large entity that is capable of high data rates and/or fast response times may prefer higher volumes of bid requests than a smaller entity. For example, a large entity may request a data rate of bid requests of 100K queries per second ("QPS") versus a small entity that may request a data rate of bid requests of only 10 QPS. This improves performance both for the customer, who sets its own query/request rate and therefore is not inundated by undesirable requests, and further improves performance across the exchange. First, the exchange expends fewer resources in sending high volumes of queries to smaller entities that are likely to be quickly saturated and unavailable to respond to a majority of the volume of requests. Second, the exchange wastes less time waiting for responses to a volume of requests that has little chance of meeting the short response time constraint, or to which the entity has no intention of responding. Using this configuration, undesired processing and/or transmission are truncated at an early stage.

Figure 16:
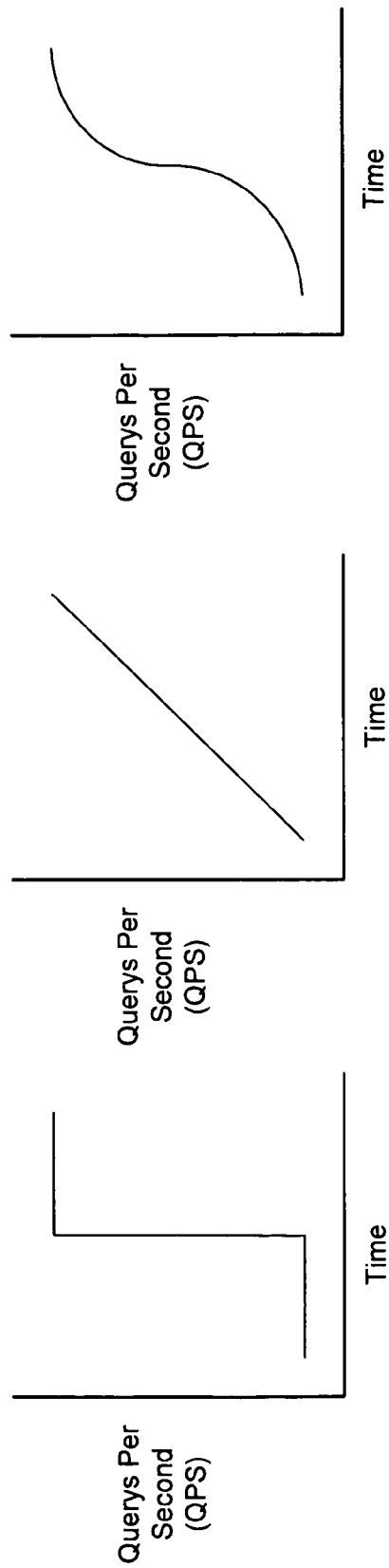
FIG. 16 illustrates some ramping profiles.

At various times, entities and/or connections may become unavailable on the exchange system. For example, an integrator network 1318 may be unable to receive or respond to queries (e.g., bid requests), and further may be unable to inform the exchange system and/or bid gateway 1344 of its status, or to even interact in other ways such as set its rate preferences. Some embodiments have a leasing time setting for each eligible entity, and some entities are further able to set their own leasing times. For example, the integrator network 1318 may set a leasing time of five minutes, and further sets a maximum bid request throughput of 100K queries per second. As an example, the advertising exchange 1332 may receive a massive number of ad calls, and may determine that integrator network 1318 is eligible for those ad calls. The bid gateway 1344 and traffic manager 1354 (e.g., by using a rate limiter 1345) may further determine whether the number of queries sent to the integrator network 1318 is less than the threshold preference set by the integrator network 1318 (e.g., 100K QPS). The bid gateway 1344 may further determine whether the integrator network 1318 has a current valid lease (e.g., that has not expired, or that has been renewed). If each condition is met, then bid request(s) are transmitted to the integrator network 1318. If for example, the network (e.g., Internet, local area, and/or collocation) network connection from the bid gateway 1344 to the integrator network 1318 fails, or becomes temporarily unavailable, due to congestion or another cause, or the internal systems or severs of the integrator network 1318 are inoperable for a period longer than the leasing time, then the system 1300 advantageously foregoes transmissions (e.g., queries or bid requests), and moreover, does not wait or expect responses from the integrator network 1318. Regardless of the cause of unavailability, the integrator network 1318 advantageously resets its leasing time, rate preferences, and other configuration settings, when it so desires or is able to resume activities on the exchange system. Moreover, the integrator network 1318 may custom tailor ramping for its activities on the exchange. For example, the integrator network 1318 may set a high volume of queries per second over a long continuous leasing time for sharp ramp up to near capacity for receiving bid requests. Alternatively, the integrator network 1318 may set incrementally increasing volumes of queries per second over several shorter leasing times for a gradual or sloped ramping of bid requests and activities on the exchange. Some ramping profiles are illustrated in FIG. 16.

In some embodiments, during operation of the system 1300, historical and/or pattern data are accumulated at various locations including, for example, the traffic manager database 1358. For example the data may include the settings of participating entities, rate preferences, leasing times, and also other information derived from the various components of the exchange system, such as the advertising exchange 1332, data collection 1350, data warehouse 1352, traffic manager 1354, and/or bid gateway 1344. The data may further include outbound targeting data, query aggregation data, and other accounting and statistical information. Customers, such as integrator networks, preferably access the stored information, such as for verification with their own records of bid requests, responses, and/or placed advertisements. Such verification is particularly useful in pay-to-play type models where the entity pays for each of a type of transaction on the exchange (e.g., pays based on number of bid requests transmitted, and/or based on number of bid responses, and not just based on winning bids or placed advertisements).

Transferring Targeting and Marketing Information In The Bid Request To Third Parties:

In some embodiments, the online advertising system passes information to third parties (e.g., integrator networks and third party agents). The information may comprise marketing and targeting information regarding users. In some embodiments, the data comprises useful targeting or marketing information regarding a user and/or segment of users such as, for example, geographic information, demographics, behavioral, soft and/or hard targeting information, among other user type information.

The recipients of the bid requests (e.g., integrator networks) may have limited information regarding the unique identifier(s) that are used by the advertising exchange. The recipients of the bid requests may, however, have substantial information regarding the user and/or browser corresponding to their own proprietary identifier system. Accordingly, the advertising exchange system of some embodiments converts the unique user identifier of the advertising exchange system, referred to herein as the "x-cookie", into a separate identifier, referred to herein as the modified "x-cookie", specific for each participating third party network. The modified x-cookie is mapped to user identifications in the third party network system. After the initial set-up to provide the mapping of identifiers, information is passed from the advertising exchange system to third parties as part of the request for bids.

Figure 17:
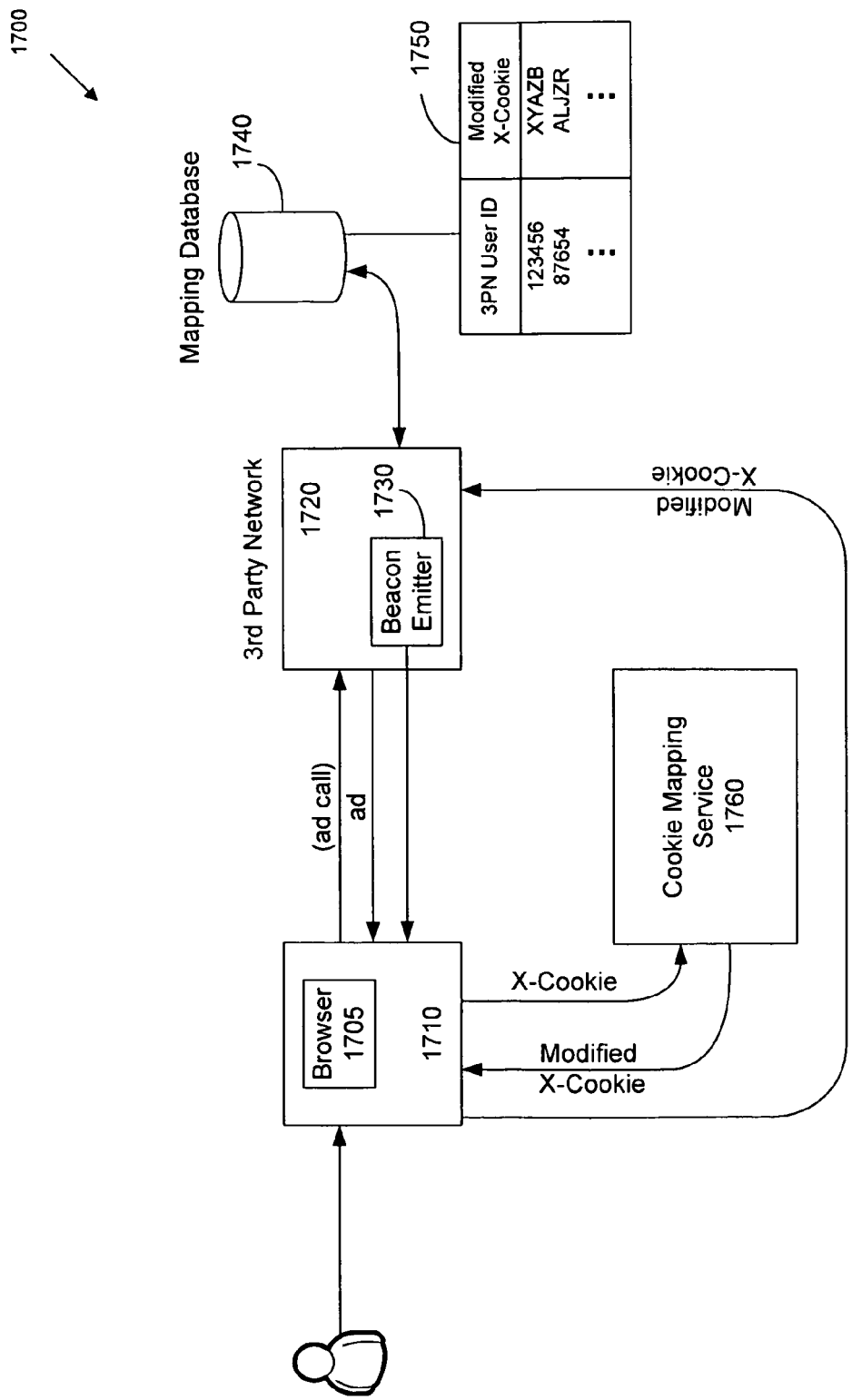
FIG. 17 is a block diagram illustrating a cookie mapping service in accordance with some embodiments.

In some embodiments, the mapping of modified x-cookies to third parties is initially set-up in an offline process (i.e., offline to the advertising system's auction for advertisement delivery). FIG. 17 is a block diagram illustrating a cookie mapping service in accordance with some embodiments. In general, the modules and computers shown in FIG. 17 operate in an off-line process. The cookie mapping service permits third party networks to map modified X-cookies, generated by the online advertising system, to user IDs used within the third party network (e.g., 3PN User ID). Once this mapping of IDs occurs, the third party network may receive information, including user targeting and marketing information, as part of a bid request in an auction to deliver an online advertisement.

The cookie mapping service is described in conjunction with a single third party network. However, any type of third party agent, including multiple third party agents, may participate in the transferring of user information in accordance with these embodiments. For this embodiment, a user computer 1710 includes a browser 1705 that generates an ad call to a third party network 1720. The third party network, in response to the ad call, determines whether a modified x-cookie (i.e., modified by the online advertising system) exists for the corresponding third party network user ID in mapping database 1740. If no mapping exists, beacon emitter 1730 redirects a call from the browser 1705 to the cookie mapping service 1760. In turn, cookie mapping service 1760 generates a modified x-cookie, specific to the third party network, and transmits the modified x-cookie to the third-party network 1720. The third-party network 1720 augments mapping database 1740 to produce a mapping 1750 between the modified x-cookie and the third party user ID.

Figure 18:
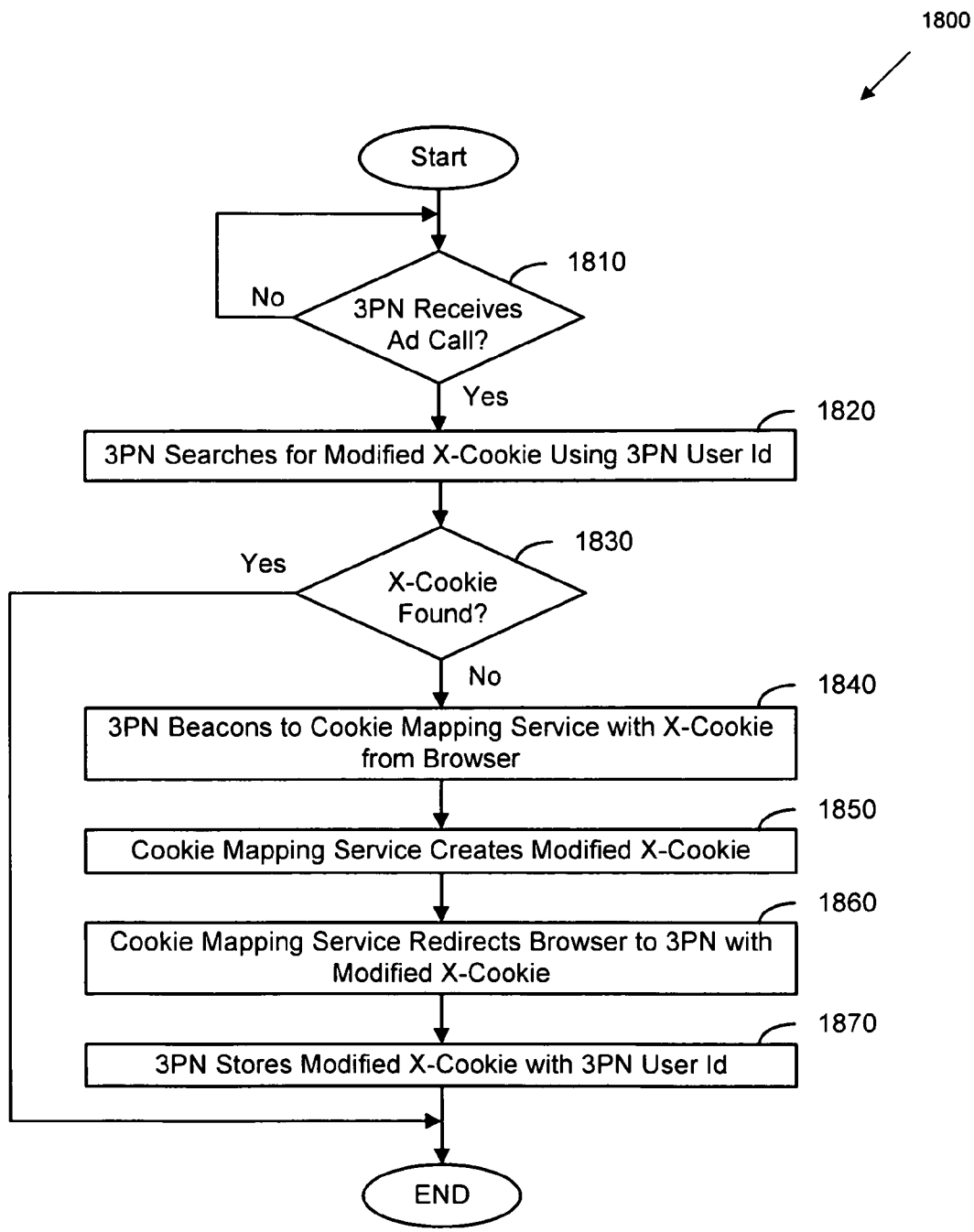
FIG. 18 is a flow diagram illustrating a cookie mapping service in accordance with some embodiments.

FIG. 18 is a flow diagram illustrating a cookie mapping service in accordance with some embodiments. The process is initiated when the third party network receives an ad call (FIG. 18, 1810). In response to the ad call, with regard to the cookie mapping service, the third party network searches for the modified x-cookie using the third-party user ID obtained from the cookie of the user's browser (FIG. 18, 1820). If the mapping between the modified x-cookie and the third-party user ID exists, the process is terminated (i.e., the mapping between the modified x-cookie and third party user ID has already occurred) (FIG. 18, 1830). If the mapping between the modified x-cookie and the third party user ID does not exist, then the third party network beacons to the cookie mapping service (FIG. 18, block 1840). An example of the re-direct call is given below.

<img src="http:yieldmanager.net/map?call=A.com&id=8769&otherstuffhere . . . "/>

In this example, the cookie mapping service is located within the yieldmanager.net domain, and the particular user/segment has an x-cookie of 8769.

Using the x-cookie, the cookie mapping service creates a modified x-cookie, specific to the third party network (FIG. 18, 1860). Some embodiments use 128 bits and/or encryption to generate the modified x-cookie from the x-cookie. More specifically, in one implementation, the modified x-cookie is generated by using the x-cookie combined with a secret value such as, for example: modified x-cookie =hash(X, secret).

The cookie mapping service uses the information contained within the mapping call to make a redirect call. An exemplary redirect call has the following format:

<redirect map.A.com/map?id=modified(8769)>

The modified x-cookie is transmitted back to the third party network, and the third party network stores the mapping between the modified x-cookie and the third-party user ID (FIG. 18, 1870).

Figure 19:
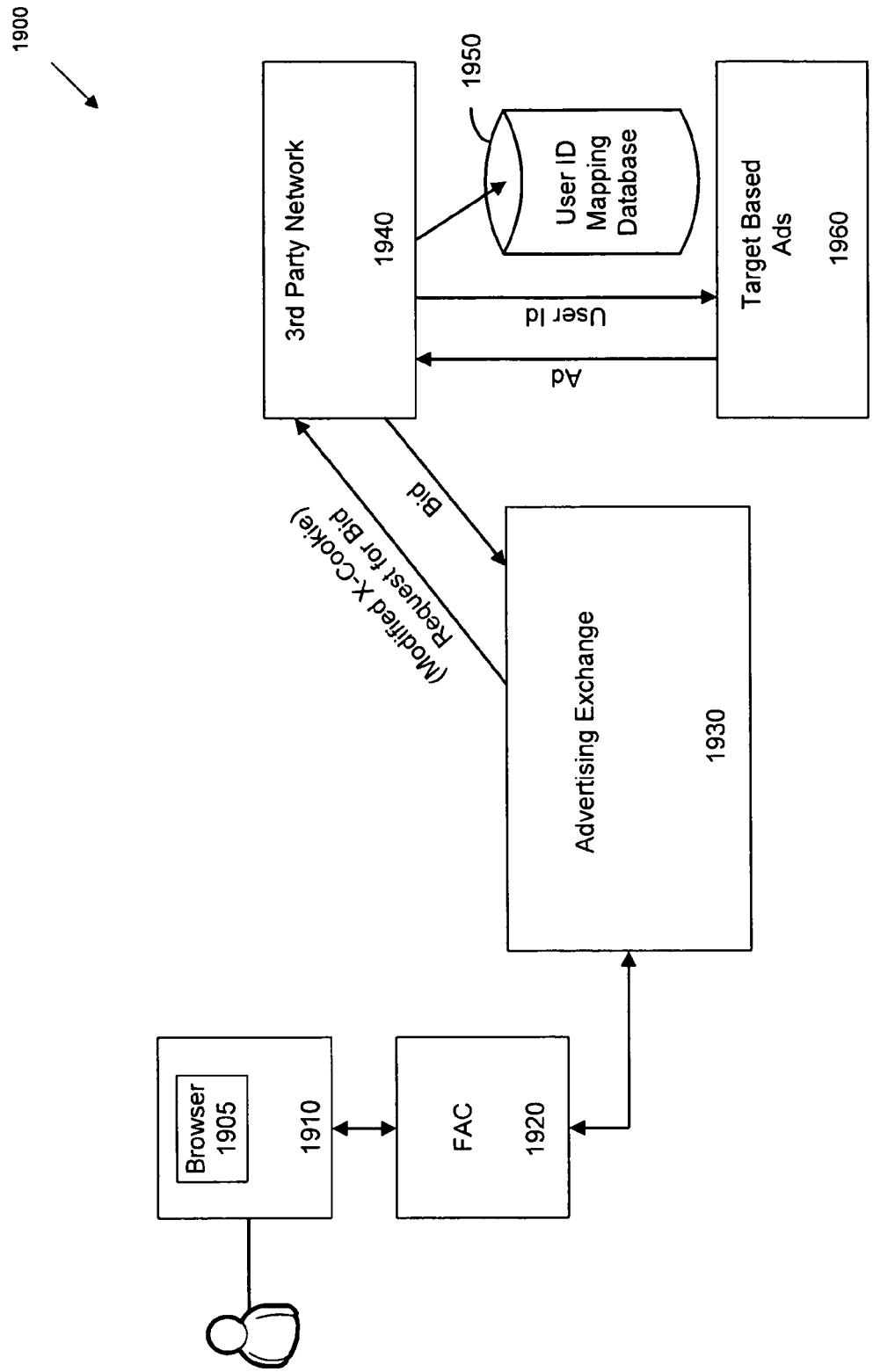
FIG. 19 is a block diagram illustrating some embodiments for the transfer of information, including targeting and marketing information, to third party networks from the advertising exchange during an auction for advertisement delivery.

FIG. 19 is a block diagram illustrating some embodiments for the transfer of information, including targeting and marketing information, to third party networks from the advertising exchange during an auction for advertisement delivery. As shown in FIG. 19, a user computer 1910 with browser 1905 generates an ad call to FAC 1920. The advertising exchange receives, from FAC 1920, an x-cookie from browser 1905. In order to conduct an auction on a per ad call opportunity basis, advertising exchange 1930 generates a request for bids, by way of example, to third party network 1940. In addition, advertising exchange 1930 generates or retrieves a modified x-cookie for the third party network 1940. The request for bid includes, in addition to information related to the opportunity, the modified x-cookie.

The third party network may use the modified x-cookie to extract information about the user, including targeting and marketing information. To this end, third party network 1940 may access user ID mapping database 1950 to extract the third party network user ID based on the modified x-cookie. The third party network may use the information about the user in a number of ways. For example, the third party network 1940 may use the information to determine whether to submit a bid for the opportunity or to determine how much to bid for the opportunity. For example, the third party network 1940 may represent advertisers (e.g., integrated entities) on the advertising exchange. The advertisers may wish to serve their advertisements to users with specific demographics. Third party network 1940 may use information about the user, obtained through the modified x-cookie and third party network ID mapping, to determine whether the user is a suitable candidate for the advertising campaign. In yet other applications, with the third party user ID, the third party network 1940 may extract advertisements, from target based ads 1960, best suited for the user. The third party network 1940 may use any number of techniques that utilize the third party user ID information, including behavioral targeting and marketing, without deviating from the spirit or scope of the invention.

Figure 20:
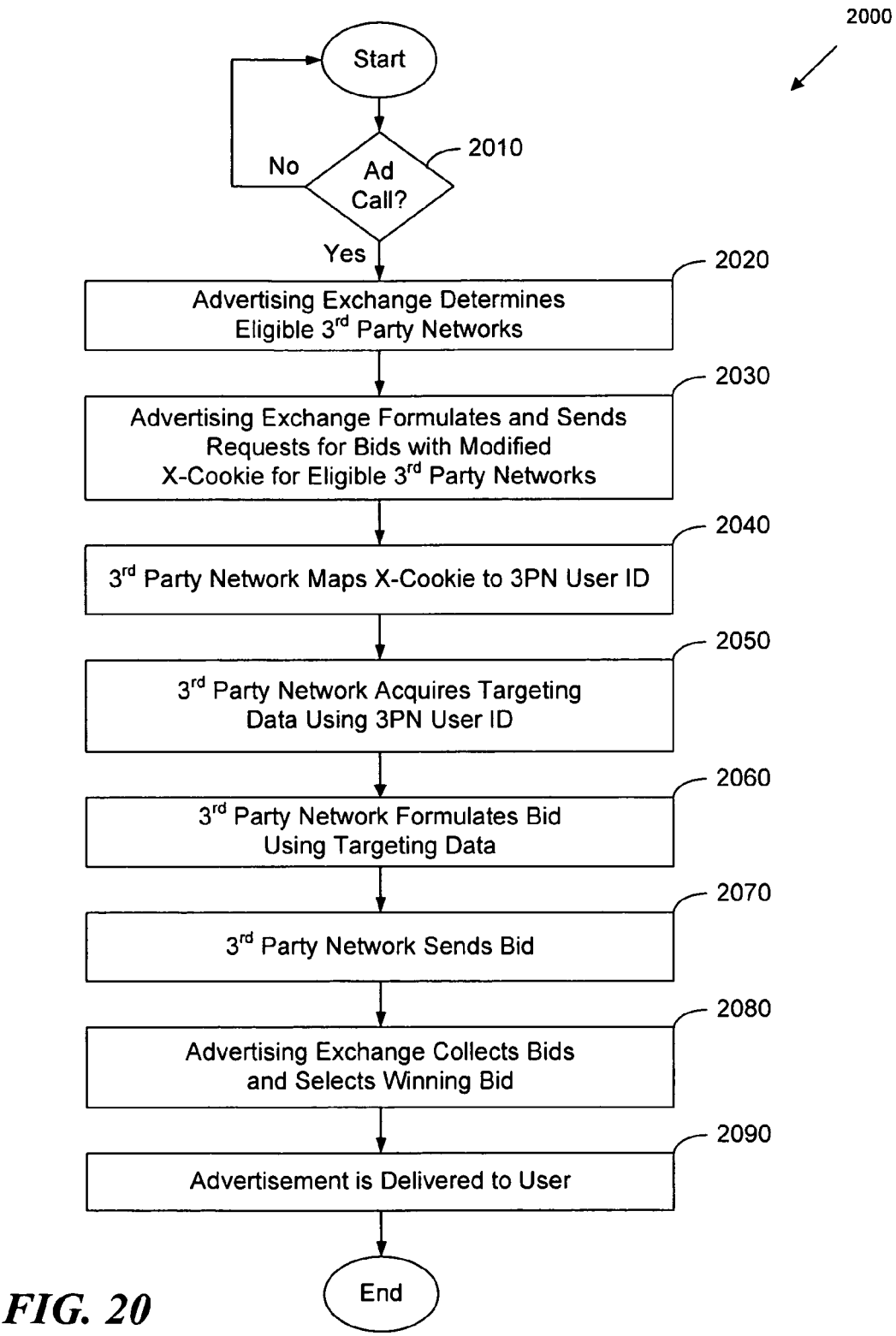
FIG. 20 is a flow diagram illustrating the transfer of user information during an auction for delivery of online advertisement in accordance with some embodiments.

FIG. 20 is a flow diagram illustrating the transfer of user information during an auction for delivery of online advertisement in accordance with some embodiments. The process is initiated when the online advertising system receives an ad call (FIG. 20, 2010). In response to the ad call, the advertising exchange determines third party networks that are eligible to receive requests for bids based on predetermined rules, constraints and agreements (FIG. 20, 2020). The advertising exchange formulates requests for bids and transmits the requests for bids with modified x-cookies to the eligible third party networks (FIG. 20, 2030). The third-party networks receive the requests for bids, including the modified x-cookie, and map the modified x-cookie to its third party user ID (FIG. 20, 2040). The third party network acquires targeting or marketing data using the third party user ID (FIG. 20, 2050). The third party network then formulates a bid using the targeting or marketing information (FIG. 20, 2060). The third party network transmits the bid back to the advertising exchange (FIG. 20, 2070). The advertising exchange collects all bids from third parties, and selects a winning bid (FIG. 20, 2080). In response to the original ad call, an advertisement is delivered to the user (FIG. 20, 2090).

In some embodiments, additional information may be passed from the advertising system to the third party networks. For example, a particular user and/or browser may have an x-cookie such that X=99. For this example, an ad call to the advertising system may include information regarding the identifier, X=99, and additional information may be retrieved from a database. For example, the information retrieved from the database, corresponding to the identifier "X=99", may be substantial and may be referred to as data D="big." The identifier and its corresponding data, (X=99, Data="big"), are passed to eligible entities. In the present example, the advertising exchange may identify three eligible entities for bid requests, including integrator networks X', X" and X'". The advertising exchange system of some embodiments combines the value of "X" in a function to generate separate X-identifiers for each eligible entity selected to receive a bid request (e.g., XID=hash (X,secretID)). For this embodiment, the secret comprises a coding sequence that is unique to each selected and/or eligible entity. Accordingly, advertising exchange system in the illustrated example generates the following XID's, and transmits them to the appropriate entity along with user information, within one or more bid requests.

User (X'=8769, Data="big")
User (X"=9876, Data="big")
User (X'"=7698, Data="big")

Within the foregoing example, the user data transmitted within each bid request is illustrated to be the same. The user data and other information in each bid request, however, may vary in alternative embodiments. In some embodiments, the recipients of the bid requests may use the information therein to determine whether and how to respond to each bid request. In some cases, the integrator networks may have vast information regarding users, segments, targeting, and other information to serve their individual purposes, and advantageously use the bid request, including the XID, to access and/or retrieve their relevant stored data. These entities may further have the means to establish, map, and continue populating such data. This feature is particularly useful when a new entity joins the exchange, when a new user and/or segment is active on the exchange, and/or when a user/segment is initially mapped and/or remapped to a new or existing entity on the exchange.

In some embodiments, the advertising exchange system may pass additional identifiers to third party networks. For example, the advertising exchange system may pass "segments" to third party networks in a request for bids for an advertisement auction system. In some embodiments, the segments comprise encoded information that identifies the user into one or more marketing segments. However, the segment may comprise any useful information about the user. In some embodiments, the encoded segments may be stored as a cookie, on the user's computer, for access by a publisher's Web site. For this embodiment, in conjunction with an ad call, the encoded segment is passed to the advertising exchange system. In turn, the advertising exchange system may pass the encoded segment to one or more third party networks or agents as part of the bid request. The segment may be referred to as encoded because the meaning of the information may not be known to the advertising exchange system. Instead, the meaning of the encoded segment is known as between the publisher, with the advertisement opportunity, and the third party network or agent of the advertising exchange system. For these embodiments, the publishers and third party networks/third party agents define the bits or fields of the segments to identify information about the user.

Embodiments To Enhance System Efficiency:

The foregoing embodiments advantageously use (bid request) rate control, time outs, and the like, to advantageously provide high-speed integrated and/or federated exchange service without the need for other optimizations, additional facilities, or components. The additional features described next are advantageously used alternatively, or in conjunction with, the foregoing embodiments.

Figure 21:
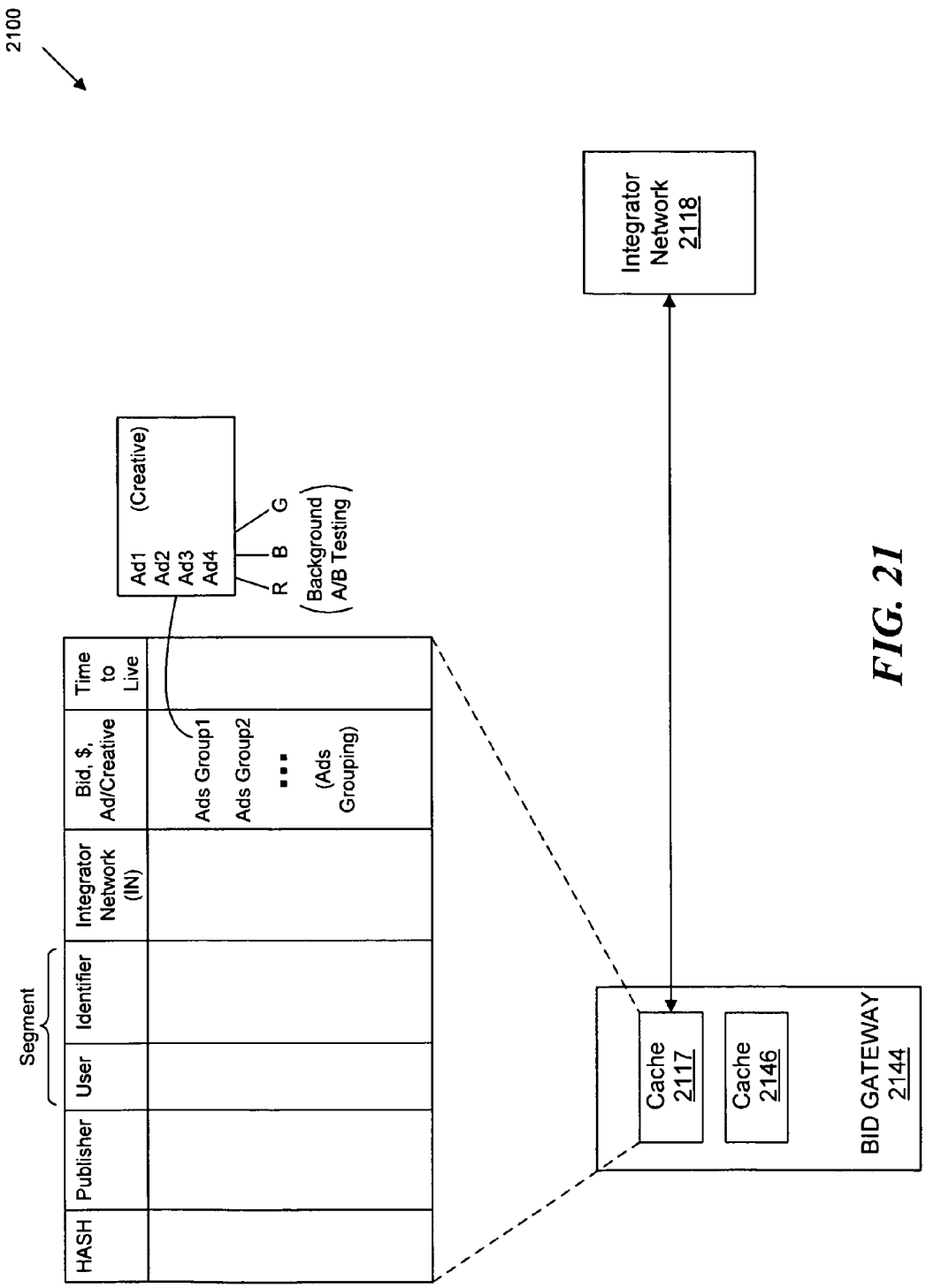
FIG. 21 illustrates an advertising bid system that implements server side caching.

FIG. 21 illustrates an advertising bid system that implements server side caching. As shown in FIG. 21, bid information, corresponding to integrator networks or third party agents, is advantageously cached at the advertising exchange. Under such a configuration, repeat bid requests and/or bid responses are generated and/or transmitted faster. In the embodiment of FIG. 21, the caching occurs at bid gateway 2144. However, in other embodiments, all or part of the caching may be stored by using other portions of the system 2100, such as integrator networks (e.g., 2118), servers for the advertising exchange, or a collocation site and/or facility, by way of example.

In some embodiments, the bid gateway 2144 is preferably coupled to each integrator network (e.g., 2118), such that caches 2117 and 2146 may be updated with the most recent and/or relevant data for the cache entries (e.g., bid information).

In some embodiments, the caching includes a rapid data retrieval format, including a lookup and/or hash table format. Such an exemplary format is illustrated in a cache 2117 of FIG. 21. The exemplary table of this embodiment includes several columns, including a hash and/or lookup value column, and columns for one or more of publisher identifiers, user identifiers including user segments, integrator network (IN) identifiers, bids for ads (e.g., creatives), and/or a time to live (TTL) column. Some embodiments group the ads and/or ad creatives by bid amount, background (R, B, G), and/or by A/B testing. Hence, some embodiments select an advertisement from a group of ads for a particular cache line/entry (e.g., randomly, or by using another method), when the cache line is selected in a high-speed response to a bid request.

The hash and/or lookup value provides a fast pattern matching system for one or more repeat occurrences of some or all of an ad call, bid request, and bid response cycle. For example, each hash and/or lookup entry in the table preferably allows for rapid matching of the content and/or inventory of a publisher to selected users, segments, integrator networks, bids, ads, and/or creatives. In some embodiments, each cache line entry expires within an optimal time period thereby minimizing unnecessary storage of stale cache entries. The time-to-live sets the time period before the cache line entry is deleted from the cache.

Figure 22:
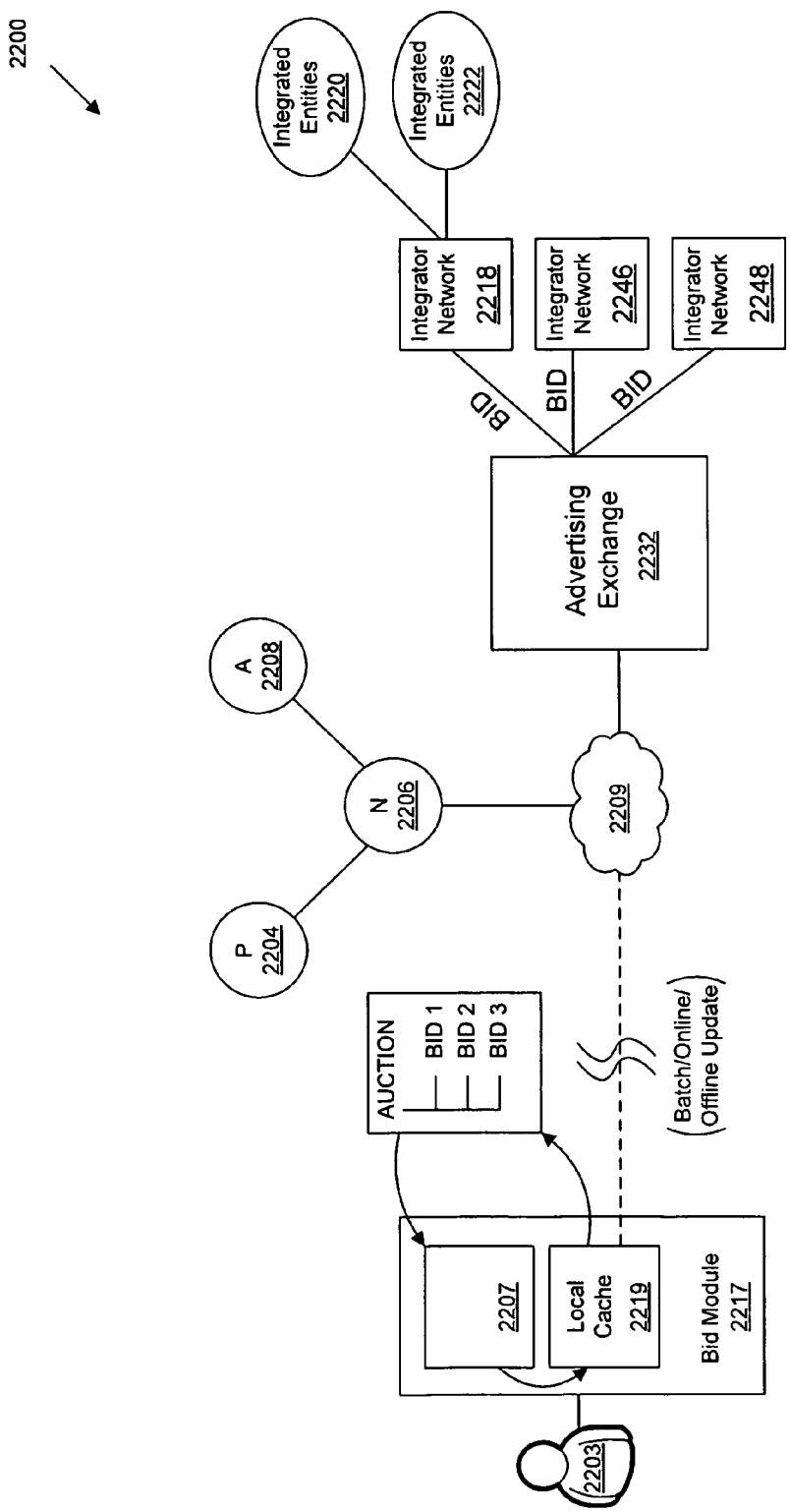
FIG. 22 illustrates a bid per opportunity advertising system that includes client and/or browser side (local) caching.

FIG. 22 illustrates a bid per opportunity advertising system that includes client and/or browser side (local) caching. As shown in FIG. 22, the system 2100 includes a user 2103 who interacts with a browser 2205. For this embodiment, the browser 2205 implements one or more auction functions on the user's machine. More specifically, the browser 2205 is coupled to various networks (2206), and one or more advertising exchanges (2232) through wide area network 2209. The network 2206 may have one or more associated entities, such as publishers 2204 and/or advertisers 2208. The system 2200 may also include integrator networks 2218, 2246, and 2248 that have integrated entities 2220 and 2222.

At various times, advertising is requested for inventory locations 2207 within the browser 2205. In some embodiments, the advertising and/or bid requests to entities of the exchange are delivered to a bid module 2217 with a local cache 2219. The bid module 2217 and local cache 2219 are associated with the browser 2205 and/or inventory 2207 that is the destination for the requested advertising. For example, bid module 2217, associated with browser 2205 and/or inventory 2207, may receive one or more bids from various sources of advertising on the exchange. In response, bid module 2217 may conduct an auction offline, online, and/or in real time to determine the winner of the auction for placement of advertising with the inventory 2207. Furthermore, the bid module 2217 may place the winning advertisement within the inventory 2207 for presentation to user 2203. In some embodiments, the bid module 2217 may further provide accounting and/or logging information. The accounting or logging information may be later used for compensation of entities as well as for overall record keeping for the entities on the exchange. Some embodiments may further provide for user segmenting and/or mapping of user information for entities on the exchange including third party entities.

In some embodiments, the local cache 2217 may comprise the contents and may be implemented similar to the cache 2217, described above in relation to FIG. 22. However, in the embodiments of FIG. 22, the cache is local to the user's 2203 machine. Accordingly, for local caching embodiments, necessary data are loaded and/or updated in an offline or batch process, and at least some or all of the ad/bid call, request, response, auction, and/or inventory placement process is performed locally at the user's local machine. Some embodiments use a scripting language (e.g., JAVA) for the module 2217, in conjunction with the local cache 2219 and browser 2205, to implement the foregoing local bid, auction, and/or placement process.

Figure 23:
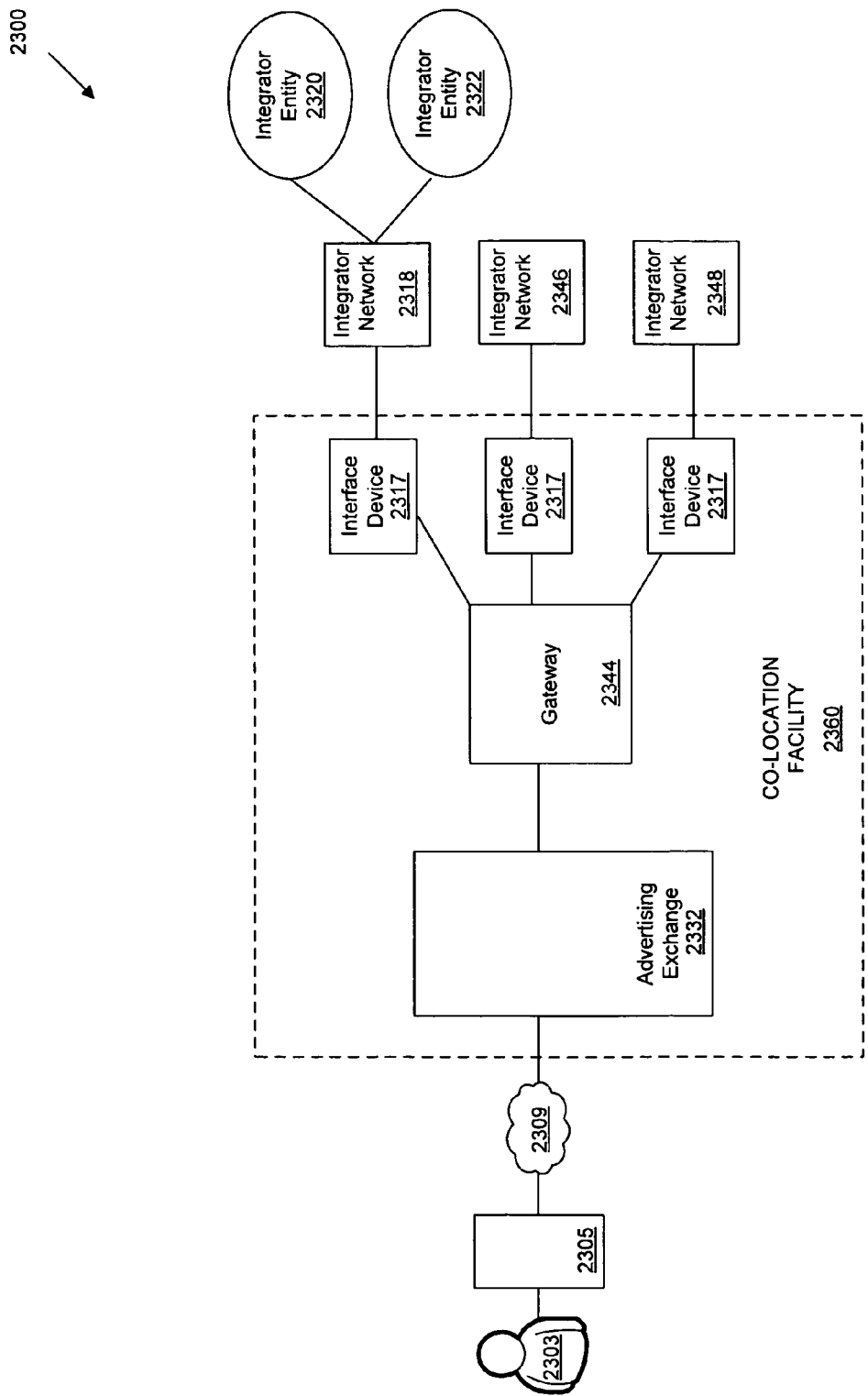
FIG. 23 illustrates an advertising system for collocation of integrator network devices within a collocation facility.

Collocation of Integrator Networks:

FIG. 23 illustrates an advertising system for collocation of integrator network devices within a collocation facility. As shown in FIG. 23, a user 2303 and browser 2305 are coupled to a collocation facility 2360 through a network 2309. The network 2309 may include a variety of networks, such as, for example, a local area network (LAN), a wide area network (WAN), a network of networks, the Internet, and other networks. One or more integrator networks 2318, 2346, 2348, and/or integrated entities 2320, and/or 2322, are coupled to the collocation facility 2360 either through the network 2309, and/or through devices 2317, 2345, and 2347 within the collocation facility 2360.

The devices 2317, 2345, and 2347 may advantageously be dedicated to the integrator networks 2318, 2346, and 2348, respectively. The devices 2317, 2345, and 2347 permit high data rate transmission between the bid gateway and the integrator network devices, and/or third-party devices, (e.g., third party bid agent equipment). High data rate transmissions include, for example, fiber optic and similar channels, gigabit Ethernet, various forms of SCSI, micro channel, and the like. The devices 2317, 2345, and 2347 may include all or part of the bid receipt and/or response architecture for one or more of the integrator networks 2318, 2346, 2348, and/or their integrated entities 2320 and 2322. Further, the devices 2317, 2345, 2347, may include caching structures such as described above within the devices, the bid gateway, and/or the exchange module within the collocation facility 2360 to further enhance the speed of operation.

The collocation facility 2360 may include, within a single site, various components for the rapid operation of a bid request/response system including, for example, one or more advertising exchanges 2332, one or more bid gateways 2344, and various integrator network and/or third party devices 2317, 2345, and 2347. Several collocation facilities 2360 are preferably located and operate from within multiple predetermined geographic regions. For instance, multiple and/or redundant collocation facilities 2360 are located within multiple locations across the Internet, such as San Francisco, Los Angeles, and New York, to serve North America and/or the United States, while additional facilities may be placed in local geographic regions to serve particular continents such as Europe, Asia, Africa, South America, and/or cities therein, as examples.

Unified Marketplace for An Online Advertisement Exchange System:

In some embodiments, the online advertising exchange system supports and facilitates the implementation of guaranteed contracts among one or more entities of the online advertising system or between one or more entities and one or more third parties to the online advertising exchange system. For example, one or more integrator networks may have relationships with one or more publishers to sell inventory available on the publisher's website. The integrator networks may also have relationships with one or more advertisers to deliver their advertisements to publishers' websites. The integrator networks may enter into guaranteed contracts with advertisers or other networks. For example, a guaranteed contract may obligate a network to deliver "x" number of impressions for the advertisers, under certain conditions, to targeted users (e.g., users with certain demographics).

Figure 24:
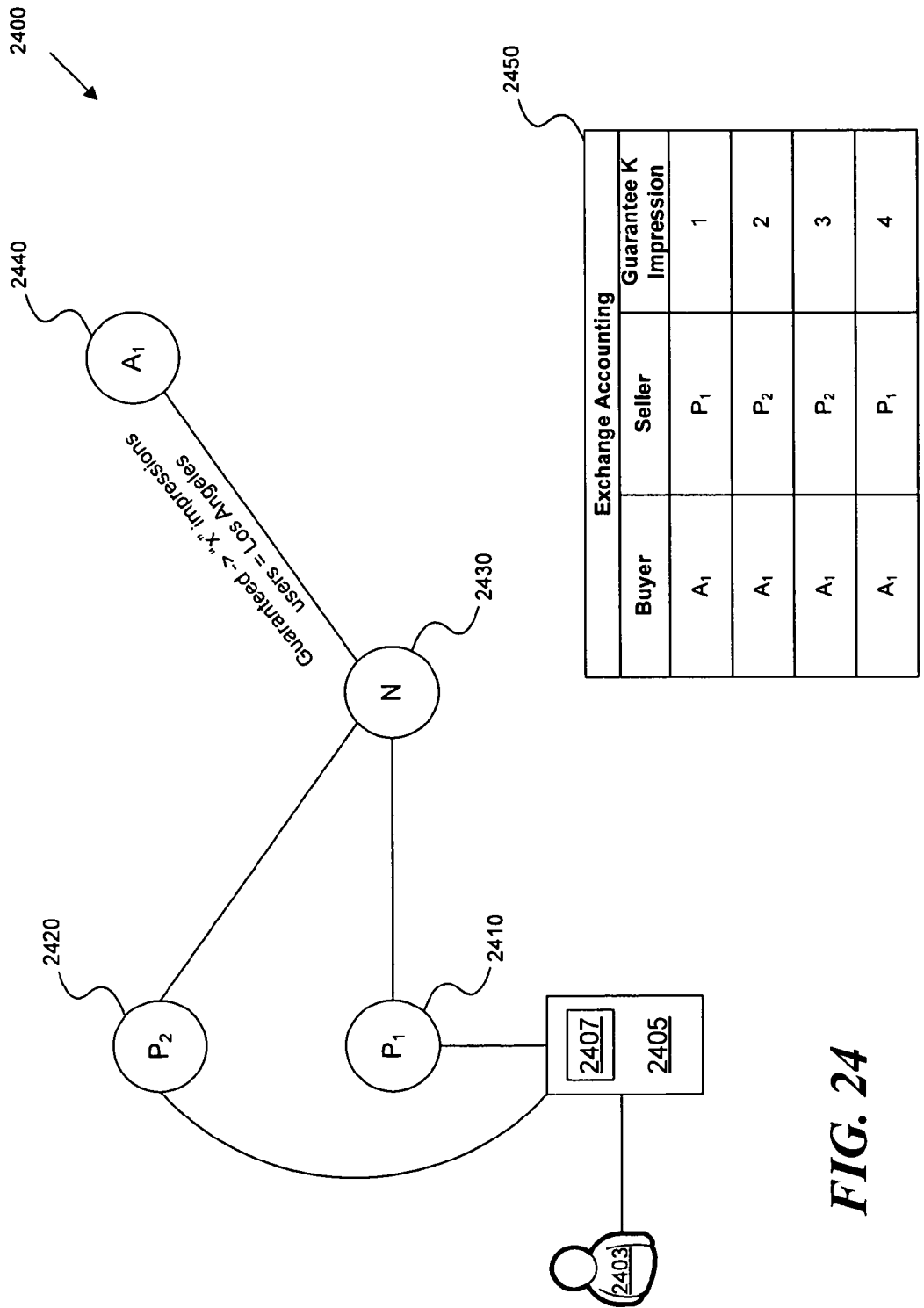
FIG. 24 illustrates an example of implementing guaranteed contracts in an online advertising exchange system.

FIG. 24 illustrates an example of implementing guaranteed contracts in an online advertising system. For the example of FIG. 24, an advertiser 2440 desires to serve advertisements to user 2403 for viewing on browser 2407 that runs on the user's computer 2405. As shown in FIG. 24, for this example, advertiser 2440 enters into a relationship (e.g., contract) with a network 2430. With regard to the online advertising exchange system, the advertiser 2440 may be characterized as a third party entity (e.g., integrated entity) to the online advertising exchange system, and network 2430 may be an integrator entity that integrates advertiser 2440 to the online advertising exchange system. For the example illustrated in FIG. 24, network 2430 enters into a guaranteed contract with advertiser 2440. Also, network 2430 has relationships with publishers 2410 and 2420, as designated by the lines in FIG. 24. Specifically, for this example, network 2430 guarantees to advertiser 2440 "x" number of impressions to users originating from a geographical origin, such as Los Angeles. Also, the guaranteed contract may specify any number of additional parameters. For example, the guaranteed contract may specify that the delivery of x impressions occur in a certain time period or occur during certain times of the day.

In some embodiments, the online advertising exchange system provides accounting to allow participants, such as advertising networks and integrator networks, to implement guaranteed contracts. Table 2450 in FIG. 24 illustrates a simplified accounting to track fulfillment of the guaranteed contract between network 2430 and advertiser 2440. To this end, table 2450 includes three columns: "buyer", "seller" and "guaranteed contract impressions." Each row of table 2450 designates a transaction (i.e., delivery of an advertisement persuaded to the guaranteed contract). The buyer column tracks, for each transaction recorded in the rows of table 2450, the purchaser of the inventory, which may include a network (e.g., ad network or integrator network) or an advertiser. For the example of FIG. 24, the buyer of the inventory is advertiser 2440 ($A_1$). The seller, which provides the inventory, comprises, in the examples of FIG. 24, publishers 2410 or 2420. The third column of table 2450, labeled guaranteed impression, designates the number of impressions delivered pursuant to the guaranteed contract. For example, the first row in table 2450 indicates that advertiser 2440 bought inventory from publisher 2410 and this purchase constituted the first impression in fulfillment of the guaranteed contract. The third row of table 2450 indicates that the advertiser 2440 purchased inventory from publisher 2420, and this transaction constituted the third impression for the guaranteed contract.

Figure 25:
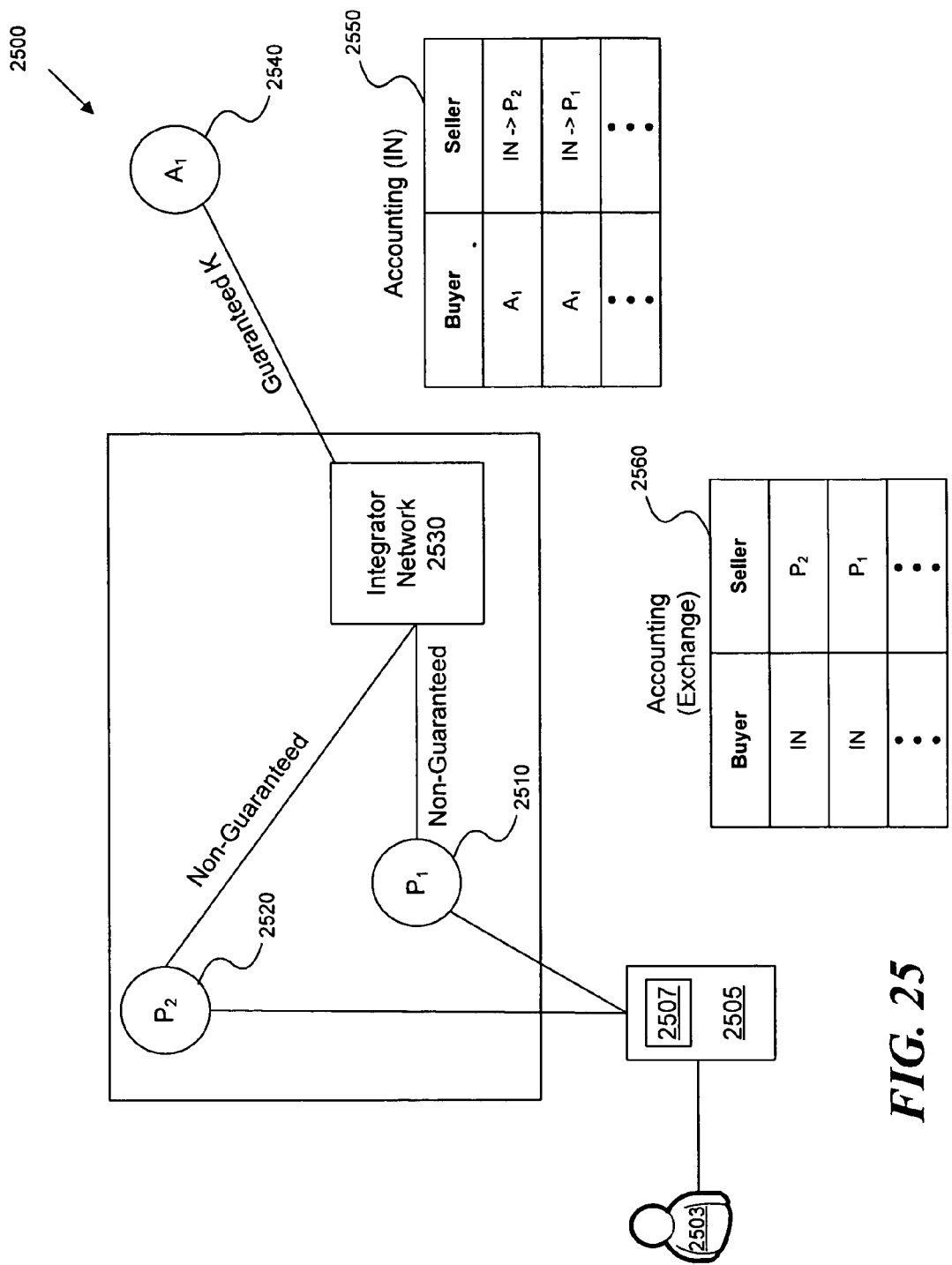
FIG. 25 illustrates an example of implementing guaranteed contracts, outside of the online advertising exchange system, while purchasing nonguaranteed inventory within the online advertising exchange system.

FIG. 25 illustrates an example of implementing guaranteed contracts, outside of the online advertising exchange system, while purchasing nonguaranteed inventory within the online advertising exchange system. In some embodiments, integrator networks may desire to enter into contracts with advertisers outside the online advertising exchange system. However, the integrator networks may wish to purchase nonguaranteed inventory within the online advertising exchange system. In general, nonguaranteed inventory constitutes inventory that does not quality to fulfill the terms and conditions of a guaranteed contract. To implement this business scheme in the example of FIG. 25, integrator network 2530 enters into a guaranteed contract with advertiser 2540. As discussed above, the guaranteed contract may specify any number of parameters for delivery of advertisements to users within the online advertising system. For this embodiment, integrator network 2530 purchases non-guaranteed inventory from publisher's 2510 and 2520 in order to fulfill the terms and conditions of the guaranteed contract between advertiser 2540 and integrator network 2530. As illustrated in FIG. 25, user 2503 receives advertisements on user computer 2505 through browser 2507 while conducting online sessions with publishers, such as publishers 2510 and 2520.

Table 2560 illustrates accounting within the online advertising exchange between buyers and sellers of non-guaranteed inventory. The buyer, listed in column 1, designates the purchaser of the nonguaranteed inventory, and the seller, listed in column 2, identifies the seller of the nonguaranteed inventory. Specifically, for this example, the integrator network is the buyer of the nonguaranteed inventory, publisher 2520 is the seller of the first transaction (e.g., row 1), and publisher 2510 is the seller of the second transaction (e.g., row 2). Table 2550 illustrates a second accounting for tracking transactions outside of the online advertising exchange pursuant to the guaranteed contract between advertiser 2550 and integrator network 2530. In the independent accounting shown in table 2550, the buyer of the inventory is advertiser 2540, and the seller of the inventory is, in essence, integrator network 2530. This accounting may be used to track transactions pursuant to the guaranteed contract between advertiser 2540 and integrator network 2530. Although the system depicted in FIG. 25 permits an integrator network, such as integrator network 2530, to enter into guaranteed contracts with advertisers and to fill those contracts with nonguaranteed inventory, the accounting is separate, and therefore cumbersome to integrator network 2530.

In some embodiments, the online advertising exchange implements a unified marketplace. For these embodiments, when conducting an auction, the online advertising exchange does not differentiate between inventory that may be sold to fulfill a guaranteed contract, and inventory that does not result in fulfillment of a guaranteed contract (i.e., referred to as "nonguaranteed inventory"). For these embodiments, when the advertising exchange module (e.g., FIG. 3) determines eligibility among entities, it does not execute a "routing" rule to select, as eligible entities, only those entities for which delivery of the opportunity results in fulfillment of a guaranteed contract. Instead, the advertising exchange module allows all eligible entities to bid on the opportunity, and it does not distinguish between guaranteed inventory and nonguaranteed inventory.

Figure 26:
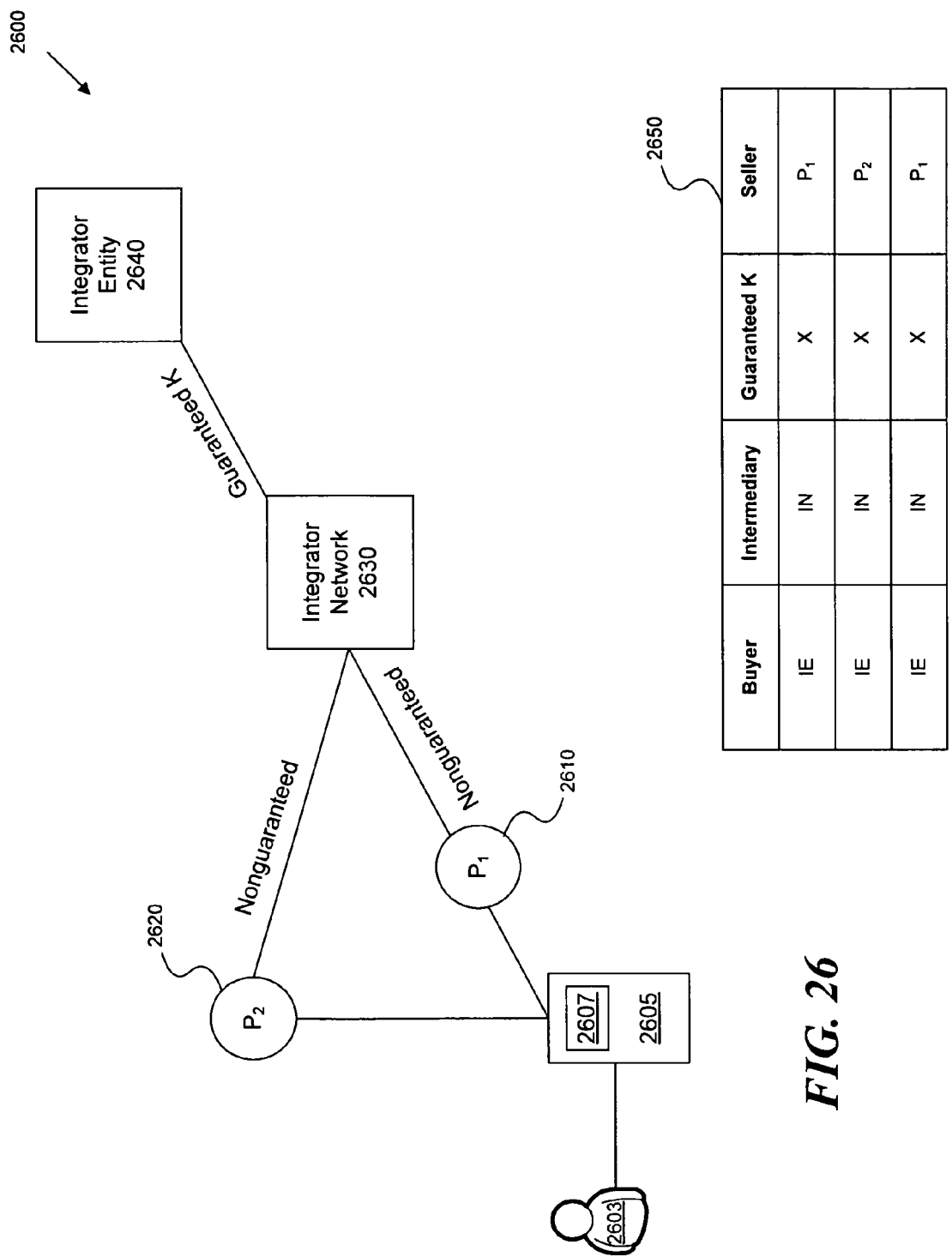
FIG. 26 illustrates an example of implementing guaranteed contracts with the purchase of nonguaranteed inventory wholly within the online advertising exchange system.

FIG. 26 illustrates an example of implementing guaranteed contracts with the purchase of nonguaranteed inventory wholly within the online advertising exchange system. In some embodiments, the online advertisement exchange system implements the unified marketplace auction as described above. Similar to the example illustrated in FIG. 25, integrator network 2630 enters into a guaranteed contract with integrated entity 2640 (e.g., an advertiser). In order to fulfill the terms and conditions of this guaranteed contract, integrator network 2630 purchases, on the online advertising exchange, nonguaranteed inventory from publishers 2610 and 2620. In turn, advertising impressions are delivered to a users computer 2605 through the user's browser 2607 for viewing by user 2603. For these embodiments, the online advertising exchange system provides an accounting to track transactions among a buyer, seller and one or more intermediaries. Although FIG. 26 shows only a single intermediary (e.g., integrator network 2630), the online advertising exchange system may track contracts among multiple intermediaries.

In some embodiments, the online advertising exchange system provides a means to track advertisement delivery pursuant to guaranteed contracts. Table 2650 illustrates a simplified version of accounting among buyers, sellers, and intermediaries. For this example, the buyer of the inventory, specified in column 1, is the integrated entity 2640. The second column, labeled intermediary, identifies one or more intermediaries involved in the transaction. For the example of FIG. 26, the intermediary comprises integrator network 2630 for the illustrated transactions. The seller, designated in the fourth column, constitutes, in this example, the integrated entity (e.g., advertiser). The third column, labeled guaranteed contract, indicates whether the transaction fulfills the terms and conditions of a guaranteed contract entered into the online advertising exchange system. For example, the first transaction illustrated in table 2650 indicates that the integrated entity 2640 purchased inventory from publisher 2610 through intermediary integrator network 2630 pursuant to a guaranteed contract between integrator network 2630 and integrated entity 2640.

Figure 27:
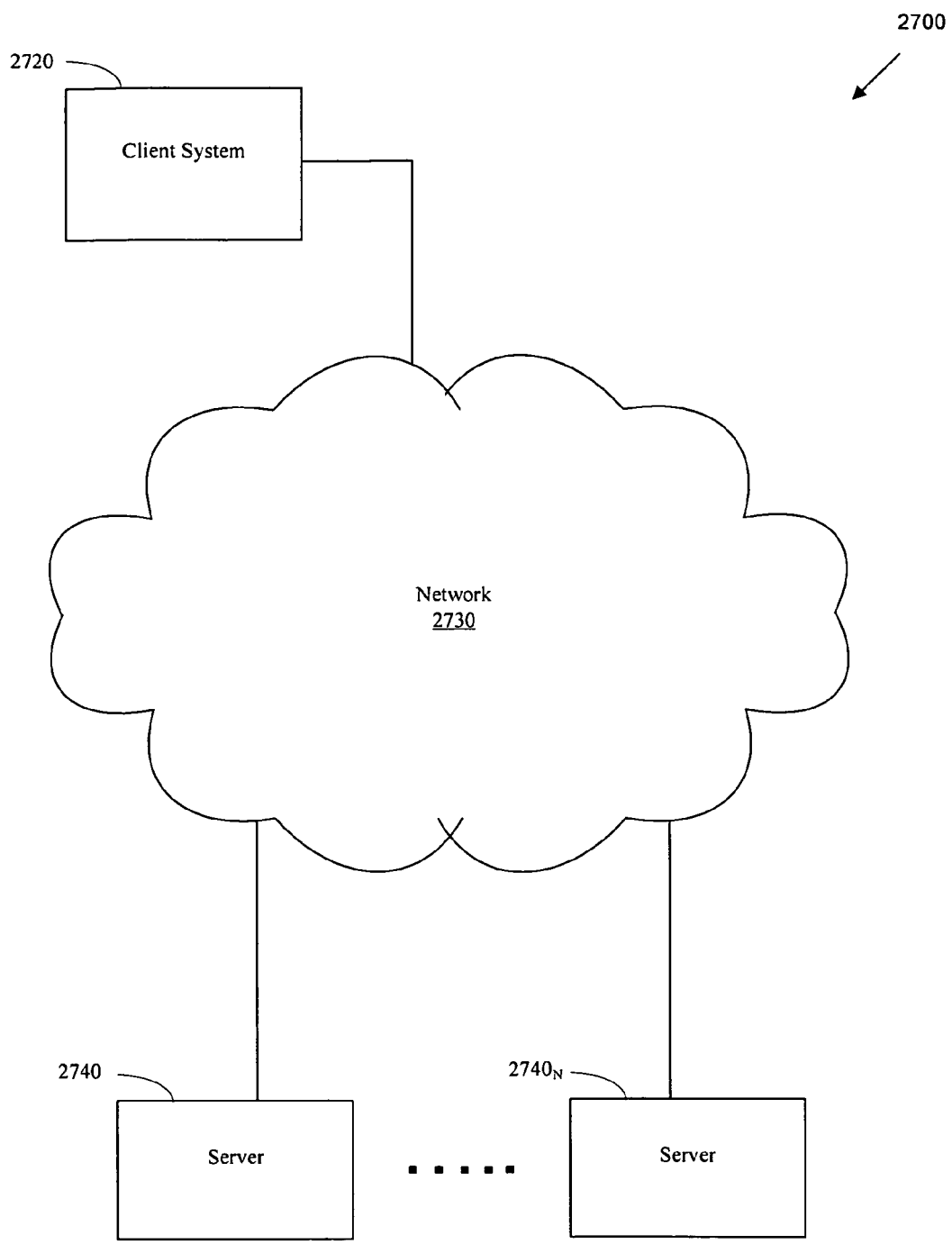
FIG. 27 illustrates one embodiment of a network environment for operation of the online advertisement system of the present invention.

Exemplary Network, Computer and Server Environments for An Advertisement Exchange:

FIG. 27 illustrates one embodiment of a network environment 2700 for operation of the online advertisement system of the present invention. The network environment 2700 includes a client system 2720 coupled to a network 2730 (such as the Internet, an intranet, an extranet, a virtual private network, a non-TCP/IP based network, any LAN or WAN, or the like) and server systems $2740_1$ to $2740_N$. The client system 2720 is configured to communicate with any of server systems $2740_1$ to $2740_N$, for example, to request and receive base content and additional content (e.g., in the form of a web page).

A server system, as defined herein, may include a single server computer or a plurality of server computers. The servers may be located at a single facility or the servers may be located at multiple facilities. In some embodiments, the advertising exchange module comprises a plurality of servers, such as server systems $2740_1$ to $2740_N$. The bid gateway comprises one or more additional servers, coupled to and accessible by the server systems for the advertising exchange module, such as server systems $2740_1$ to $2740_N$. In addition, the third parties to the online advertising exchange system, such as integrator networks, third party agents and third party recipients, comprises one ore more severs, such as servers $2740_1$ to $2740_N$. As such, servers $2740_1$ to $2740_N$ are intended to represent a broad class of server farm architectures and the servers $2740_1$ to $2740_N$ may be configured in any manner without deviating from the spirit or scope of the invention.

The client system 2720 may include a desktop personal computer, workstation, laptop, PDA, cell phone, any wireless application protocol (WAP) enabled device, or any other device capable of communicating directly or indirectly to a network. The client system 2720 typically runs a web browsing program that allows a user of the client system 2720 to request and receive content from server systems $2740_1$ to $2740_N$ over network 1430. The client system 2720 typically includes one or more user interface devices 2722 (such as a keyboard, a mouse, a roller ball, a touch screen, a pen or the like) for interacting with a graphical user interface (GUI) of the web browser on a display (e.g., monitor screen, LCD display, etc.).

In some embodiments, the client system 2720 and/or system servers $2740_1$ to $2740_N$ are configured to perform the methods described herein. The methods of some embodiments may be implemented in software or hardware configured to optimize the selection of additional content to be displayed to a user.

Figure 28:
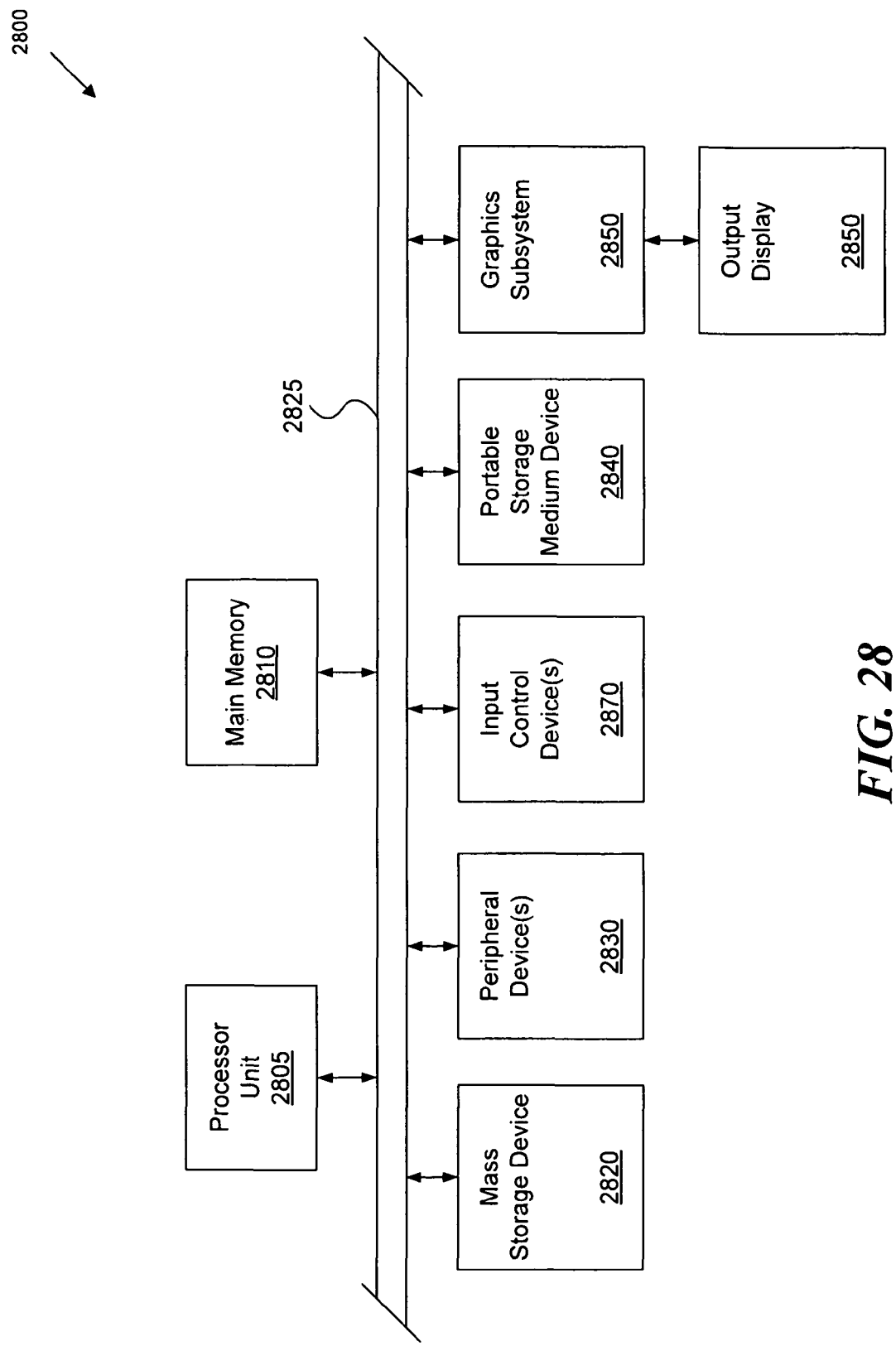
FIG. 28 illustrates a high-level block diagram of a general-purpose computer system.

FIG. 28 illustrates a high-level block diagram of a general purpose computer system. The general purpose computer system may be a user computer or a server computer. A computer system 2800 contains a processor unit 2805, main memory 2828, and an interconnect bus 2825. The processor unit 2805 may contain a single microprocessor, or may contain a plurality of microprocessors for configuring the computer system 2800 as a multi-processor system. The main memory 2810 stores, in part, instructions and data for execution by the processor unit 2805. If the online advertisement system of the present invention is partially implemented in software, the main memory 2810 stores the executable code when in operation. The main memory 2810 may include banks of dynamic random access memory (DRAM) as well as high-speed cache memory.

The computer system 2800 further includes a mass storage device 2820, peripheral device(s) 2830, portable storage medium drive(s) 2840, input control device(s) 2870, a graphics subsystem 2850, and an output display 2860. For purposes of simplicity, all components in the computer system 2800 are shown in FIG. 28 as being connected via the bus 2825. However, the computer system 2800 may be connected through one or more data transport means. For example, the processor unit 2805 and the main memory 2810 may be connected via a local microprocessor bus, and the mass storage device 2820, peripheral device(s) 2830, portable storage medium drive(s) 2840, graphics subsystem 2850 may be connected via one or more input/output (I/O) busses. The mass storage device 2820, which may be implemented with a magnetic disk drive or an optical disk drive, is a non-volatile storage device for storing data and instructions for use by the processor unit 2805. In the software embodiment, the mass storage device 2820 stores the online advertisement system software for loading to the main memory 2810.

The portable storage medium drive 2840 operates in conjunction with a portable non-volatile storage medium, such as a compact disc read only memory (CD-ROM), to input and output data and code to and from the computer system 2800. In one embodiment, the online advertisement system software is stored on such a portable medium, and is input to the computer system 2800 via the portable storage medium drive 2840. The peripheral device(s) 2830 may include any type of computer support device, such as an input/output (I/O) interface, to add additional functionality to the computer system 2800. For example, the peripheral device(s) 2830 may include a network interface card for interfacing the computer system 2800 to a network.

The input control device(s) 2870 provide a portion of the user interface for a user of the computer system 2800. The input control device(s) 2870 may include an alphanumeric keypad for inputting alphanumeric and other key information, a cursor control device, such as a mouse, a trackball, stylus, or cursor direction keys. In order to display textual and graphical information, the computer system 2800 contains the graphics subsystem 2850 and the output display 2860. The output display 2860 may include a cathode ray tube (CRT) display or liquid crystal display (LCD). The graphics subsystem 2850 receives textual and graphical information, and processes the information for output to the output display 2860. The components contained in the computer system 2800 are those typically found in general purpose computer systems, and in fact, these components are intended to represent a broad category of such computer components that are well known in the art.

In some embodiments, the online advertisement system is software that includes a plurality of computer executable instructions for implementation on a general purpose computer system. Prior to loading into a general purpose computer system, the online advertisement system software may reside as encoded information on a computer readable medium, such as a hard disk drive, non-volatile memory (e.g., flash), compact disc read only memory (CD-ROM) or DVD.

Some embodiments may include a computer program product which is a storage medium (media) having instructions stored thereon/in that may be used to control, or cause, a computer to perform any of the processes of the invention. The storage medium may include, without limitation, any type of disk including floppy disks, mini disks (MD's), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), some implementations include software for controlling both the hardware of the general purpose/specialized computer or microprocessor, and for enabling the computer or microprocessor to interact with a human user or other mechanism utilizing the results of the invention. Such software may include without limitation device drivers, operating systems, and user applications. Ultimately, such computer readable media further includes software for performing aspects of the invention, as described above.

Included in the programming (software) of the general/specialized computer or microprocessor are software modules for implementing the teachings of the invention, including without limitation encoding an archive from a library to generate an encoded archive that is compatible with a virtual library device, and uploading the encoded archive, according to the processes described above.

In one hardware implementation, the online advertisement system may comprise a dedicated processor including processor instructions for performing the functions described herein. Circuits may also be developed to perform the functions described herein.

Although the present invention has been described in terms of specific exemplary embodiments, it will be appreciated that various modifications and alterations might be made by those skilled in the art without departing from the spirit and scope of the invention.

What is claimed is:

1. A system comprising:
   at least one Web server comprising a processor unit and memory for generating at least one request for a service bid, said request for service bids comprising information to identify a plurality of third party recipients; and
   at least one gateway server, comprising a processor unit and memory, coupled to said Web server, for receiving said request for a service bid from said Web server, for configuring a third party bid request for each recipient identified in said request for a service bid, for transmitting said third party bid request from said bid gateway server to said third party recipients, for collecting at least one bid from said third party recipients, and for transmitting said bids to an exchange server, wherein said transmitted third party bid requests comprise an amount of targeting information related to said service bid customized by said third party recipients.

2. The system as set forth in claim 1, wherein said Web server and bid gateway server communicate using an internal protocol.

3. The system as set forth in claim 1, wherein said bid gateway server for configuring a third party bid request for each recipient further for identifying an end point network address for each recipient identified in said request for a service bid.

4. The system as set forth in claim 1, wherein said bid gateway server for configuring a third party bid request for each recipient further for generating a third party bid request based on a pre-determined protocol for each recipient identified in said request for a service bid.

5. The system as set forth in claim 1, wherein:
   said service bid further comprises information regarding a user; and
   said bid gateway server for configuring a third party bid request for each recipient further for generating a third party bid request comprising at least a subset of said information.

6. The system as set forth in claim 1, wherein said bid gateway server for configuring a third party bid request for each recipient further for:

- determining whether a third party recipient has exceeded a threshold of bid requests; and
- transmitting said third party bid request from said bid gateway server to at least one third party recipient if said third party recipient has not exceeded a threshold of bid requests.

7. The system as set forth in claim 1, wherein said bid gateway server for collecting bids from at least one third party recipient further for waiting a predetermined amount of time for a response from a third party recipient, and for not collecting a bid from said third party recipient if said third party recipient does not respond within said predetermined amount of time.

8. A non-transitory computer readable medium for storing a plurality of instructions, which when executed by a computer causes the computer transmitting bids, said instructions for:

- generating, at a Web server, at least one request for a service bid, said request for service bids comprising information to identify a plurality of third party recipients;
- receiving, at a bid gateway server, said request for a service bid from said Web server;
- configuring a third party bid request for each recipient identified in said request for a service bid, wherein said third party bid request comprises an amount of targeting information related to said service bid customized by said third party recipients;
- transmitting said third party bid request from said bid gateway server to said third party recipients, for collecting at least one bid from said third party recipients, and for transmitting said bids to an exchange server.

9. The computer readable medium as set forth in claim 8, further comprising instructions for communicating said Web server and said bid gateway server using an internal protocol.

10. The computer readable medium as set forth in claim 8, further comprising instructions for configuring a third party bid request for each recipient and further for identifying an end point network address for each recipient identified in said request for a service bid.

11. The computer readable medium as set forth in claim 8, further comprising instructions for configuring a third party bid request for each recipient and further for generating a third party bid request based on a pre-determined protocol for each recipient identified in said request for a service bid.

12. The computer readable medium as set forth in claim 8, said service bid further comprises information regarding a user, said instructions further for:

- configuring a third party bid request for each recipient; and
- generating a third party bid request comprising at least a subset of said information.

13. The computer readable medium as set forth in claim 8, said instructions for configuring a third party bid request for each recipient further comprises instructions for:

- determining whether a third party recipient has exceeded a threshold of bid requests; and
- transmitting said third party bid request from said bid gateway server to at least one third party recipient if said third party recipient has not exceeded a threshold of bid requests.

14. The computer readable medium as set forth in claim 8, further comprising instructions for waiting a predetermined amount of time for a response from a third party recipient, and for not collecting a bid from said third party recipient if said third party recipient does not respond within said predetermined amount of time.

* * * * *